United States Patent
Tsai

(10) Patent No.: US 11,610,531 B2
(45) Date of Patent: Mar. 21, 2023

(54) DISPLAY DEVICE

(71) Applicant: AU OPTRONICS CORPORATION, Hsin-Chu (TW)

(72) Inventor: Zong-Huei Tsai, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 67 days.

(21) Appl. No.: 17/351,579

(22) Filed: Jun. 18, 2021

(65) Prior Publication Data

US 2022/0005398 A1    Jan. 6, 2022

(30) Foreign Application Priority Data

Jul. 2, 2020    (TW) .................................. 109122436

(51) Int. Cl.
*G09G 5/20*    (2006.01)
*G09G 3/20*    (2006.01)
*G09G 3/34*    (2006.01)

(52) U.S. Cl.
CPC .......... *G09G 3/2074* (2013.01); *G09G 3/3413* (2013.01); *G09G 2320/0666* (2013.01)

(58) Field of Classification Search
CPC ............... G09G 3/2074; G09G 3/3413; G09G 2320/0666; B02B 27/0172; B02B 27/0174; B02B 27/0178; B02B 3/08
USPC .......................................................... 345/55
See application file for complete search history.

(56) References Cited

U.S. PATENT DOCUMENTS

| | | | |
|---|---|---|---|
| 10,677,421 B2 | 6/2020 | Takeshita et al. | |
| 2013/0234935 A1* | 9/2013 | Griffith | G02B 27/0093 |
| | | | 359/240 |
| 2014/0267442 A1* | 9/2014 | Lin | G09G 3/3208 |
| | | | 345/77 |
| 2014/0292206 A1 | 10/2014 | Lashina et al. | |
| 2016/0033769 A1* | 2/2016 | Kang | G02B 3/08 |
| | | | 359/13 |
| 2017/0039960 A1* | 2/2017 | Jepsen | G02B 27/0172 |

(Continued)

FOREIGN PATENT DOCUMENTS

| CN | 107167958 A | 9/2017 |
|---|---|---|
| CN | 107623019 A | 1/2018 |

(Continued)

OTHER PUBLICATIONS

CNIPA has issued the Office Action for the corresponding China application dated Mar. 1, 2022.

(Continued)

*Primary Examiner* — Jennifer T Nguyen
(74) *Attorney, Agent, or Firm* — WPAT, PC

(57) ABSTRACT

The present invention provides a display device having a display panel. The display panel has a display surface and a plurality of pixels. At least some of the pixels include: an illumination unit and a display unit. The illumination unit has at least one illumination sub-pixel and at least one light orientation element respectively and correspondingly disposed on the at least one illumination sub-pixel, and illumination light from the illumination sub-pixel is directly or indirectly emitted from the display surface through the light orientation element. The display unit has at least one display sub-pixel, and display light from the display sub-pixel is directly or indirectly emitted from the display surface.

27 Claims, 23 Drawing Sheets

(56) References Cited

U.S. PATENT DOCUMENTS

2017/0337863 A1* 11/2017 Chang .................. G09G 3/2003
2021/0158746 A1*  5/2021 Li ........................ G09G 3/3225

FOREIGN PATENT DOCUMENTS

| CN | 107731862 A | 2/2018 |
| CN | 108626639 | 10/2018 |
| TW | I683162 B | 1/2020 |

OTHER PUBLICATIONS

Taiwan Patent Office "Office Action" dated Apr. 29, 2021, Taiwan.

* cited by examiner

DISPLAY DEVICE

BACKGROUND OF THE INVENTION

1. Field of the Invention

The present disclosure relates to a display device. Specifically, the present disclosure related to a display device having an illumination unit and a display unit.

2. Description of the Prior Art

Along with the progression of technology, people hope that display devices can be merged with the environment to add additional pleasure to their lives. For example, people hope to have windows in their buildings and to enjoy the scenery of the outdoor, or to feel the changing of natural light projected from the window. In that respect, many studies show that when people live in a space without windows for too long, their psychological health would be affected, their physiological rhythm might even be messed up, and their sense of time might be lost. However, along with developments in urbanization and trends of modernization, more and more people have been in an environment without windows or need to work in an environment without windows. Therefore, a display device which can display window views and project window light as virtual windows are increasingly needed.

SUMMARY OF THE INVENTION

Technical Ways to Solve the Problem

In order to solve the problem, an embodiment according to the present disclosure provides a display device comprising: a display panel having a display surface and a plurality of pixels. Wherein, at least some of the pixels include: an illumination unit and a display unit. The illumination unit has at least one illumination sub-pixel and at least one light orientation element respectively and correspondingly disposed on at least one illumination sub-pixel, and illumination light from the illumination sub-pixel is directly or indirectly emitted from the display surface through the light orientation element. The display unit has at least one display sub-pixel, and display light from the display sub-pixel is directly or indirectly emitted from the display surface.

Another embodiment of the present disclosure provides a display device, comprising: a display panel. The display panel has a display surface, a plurality of illumination units, and a plurality of display units disposed corresponding to the plurality of illumination units. Wherein, each of the illumination units has at least one illumination sub-pixel and a light orientation element respectively and correspondingly disposed on at least one illumination sub-pixel, and illumination light from the illumination sub-pixel is directly or indirectly emitted from the display surface through the light orientation element. Wherein each of the plurality of display units has at least one display sub-pixel, and display light from the display sub-pixel is directly or indirectly emitted from the display surface.

Effects as Opposed to the Prior Arts

According to the display device provided by each embodiment of the present disclosure, displaying the image and projecting the illumination light can be conducted respectively and independently. Thus, users can view the display screen and illumination light projected on a specific surface at the same time. Therefore, administrative levels and applicability of the display device can be increased and the display device can be configured to simulate scenery and natural light so as to improve the experience or physical and mental health of the users.

DETAILED DESCRIPTION OF THE PREFERRED EMBODIMENT

Various embodiments according to the present invention will be described in detail below, and people skilled in the art can easily understand the conception principles of the present disclosure with reference to the accompanying drawings. However, some specific embodiments are described in the specifications. These embodiments merely represent examples and are never meant to limit the scope of the present disclosure. Therefore, people skilled in the art can easily accomplish the various variations and modifications of the embodiments of the present disclosure without departing from the conception principles of the present disclosure.

Figure 1:
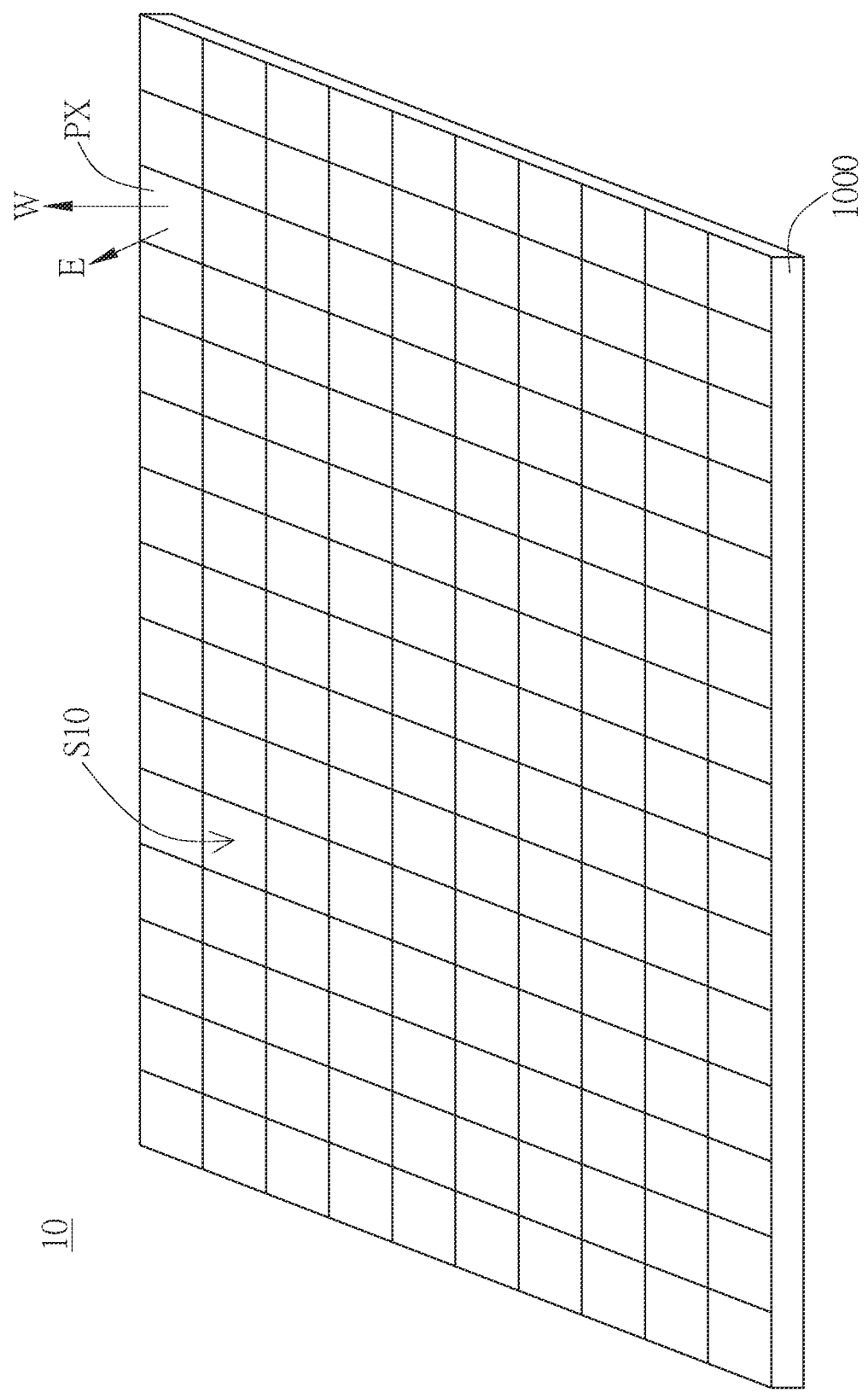
FIG. 1 is a perspective view of a display device having a display panel in an embodiment according to the present disclosure.

Please refer to FIG. 1. A display device 10 in an embodiment according to the present disclosure includes a display panel 1000. The display panel 1000 has a display surface S10 and a plurality of pixels PX. And display light E for displaying and/or illumination light W for projection is/are directly or indirectly emitted from pixels PX through the display surface S10.

Figure 2:
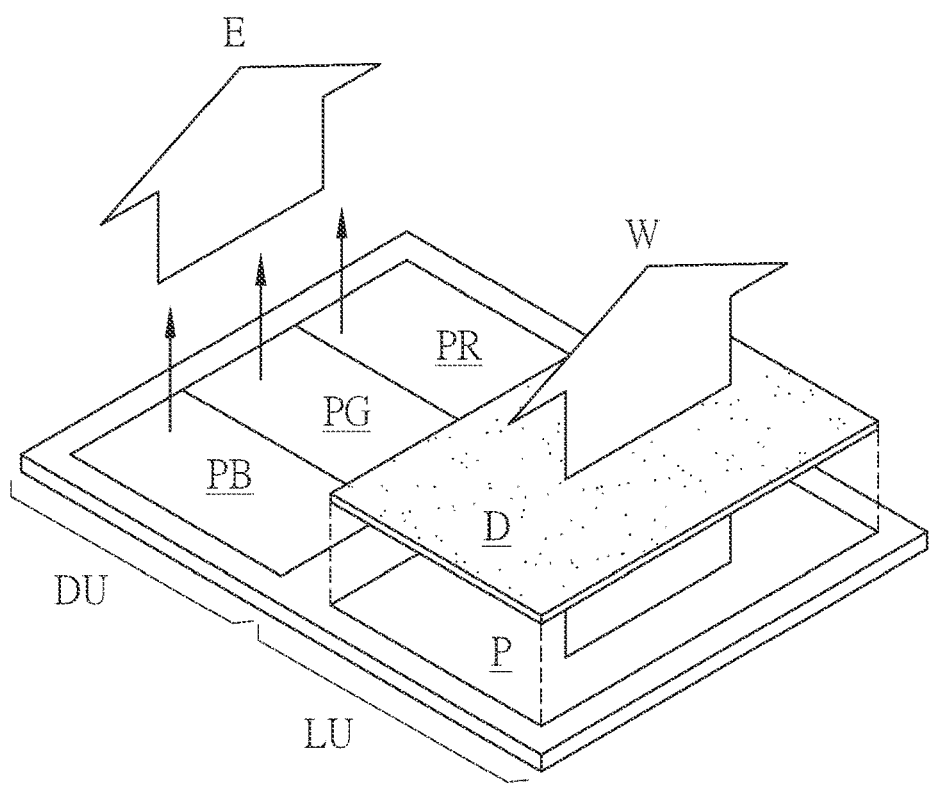
FIG. 2 is a diagram of a pixel having an illumination unit and a display unit in an embodiment according to the present disclosure.

Specifically, please refer to FIG. 2 together with FIG. 1. In the display panel 1000, at least some of the pixels PX includes an illumination unit LU and a display unit DU. The illumination unit LU may have at least one illumination sub-pixel P and a light orientation element D respectively and correspondingly disposed on at least one illumination sub-pixel P. In addition, the display unit DU may have at least one display sub-pixel. For example, the display unit DU may have a display sub-pixel PR configured to display red display light, a display sub-pixel PG configured to display green display light and a display sub-pixel PB configured to display blue display light.

Then, according to the present embodiment illustrated in FIG. 1 and FIG. 2, when using the display device 10, illumination light W from the illumination sub-pixel P of the pixels PX can be controlled to be directly or indirectly emitted from the display surface S10 of the light orientation element D. Therefore, projection light having directionality can appear. On the other hand, when using the display device 10, display light E form the display sub-pixels PR, PG and PB of the pixels PX can be controlled to be directly or indirectly emitted from the display surface S10. Therefore, the expected screen can appear. Therefore, the display device 10 according to the present embodiment can realize the effect of projecting light having directionality and displaying the expected screen.

In the present specification, when the screen or the light is said to be "from" the illumination sub-pixel P or the display sub-pixels PR, PG and PB, it may mean that light is emitted based on the illumination sub-pixel P or the display sub-pixels PR, PG and PB themselves, but it is also possible that the light is emitted by another light source and emitted through the illumination sub-pixel P or the display sub-pixels PR, PG and PB. Thus, throughout this specification, when the illumination sub-pixel or the display sub-pixel is not described specifically, it should be deemed to include various possible ways of light emission such as light emitted by itself (the illumination sub-pixel or the display sub-pixels) or light emitted from another light source forming light emission through itself (the illumination sub-pixel or the display sub-pixels) and the like; however, this present disclosure is not limited thereto.

At least one light orientation elements D may respectively have a fixed or variable directivity; and they may have the same or different directivities. Therefore, the light can be guided to a specific direction by the light orientation elements D, so that the projected light can be illuminated toward the specific direction and the users can perceive illumination directivities of the light. For example, one of the at least one light orientation elements D may be a first light orientation element, and the other of the at least one light orientation elements D may be a second light orientation element (for example, the first light orientation element D1 and the second light orientation element D2 illustrated in the later mentioned FIG. 4; however, it is not limited thereto). Then, the first light orientation element D1 and the second light orientation element D2 may respectively guide the illumination light W to the same or different pointing direction. Specifically, the first light orientation element D1 and the second light orientation element D2 can be configured to guide the illumination light W to different directions so as to make the directivity of the illumination light W more flexible by turning the different illumination sub-pixel P on and off.

Herein, what is meant by "directivity" or "pointing direction", for example, may be the central column of distribution of the light field of the light or the direction in which the intensity of the light is greatest, and it does not mean that the light progresses along the pointing direction perfectly. For example, most of the light may progress along the pointing direction and seems to be emitted in accordance with the pointing direction; however, a part of the light field may deviate from the pointing direction in actuallity. Embodiments and patterns of the directivity of the light orientation element are described in detail in below.

Figure 3A:
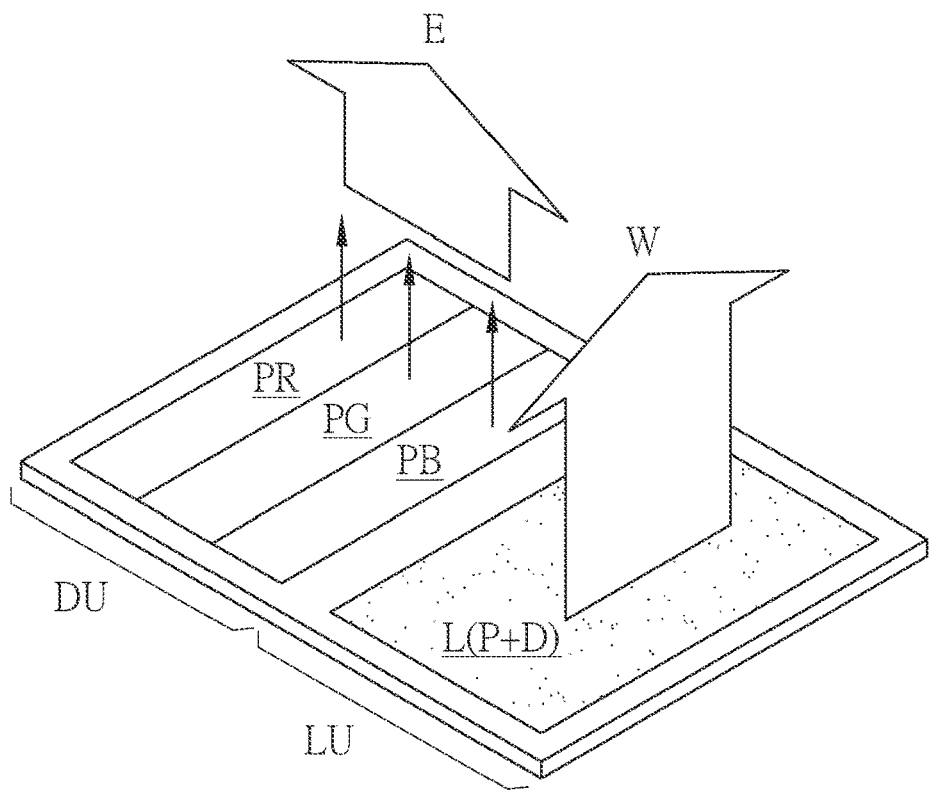
FIG. 3A to FIG. 3C are diagrams of the illumination units and the display units of the pixel respectively emitting illumination light and display light in each embodiment according to the present disclosure.
Figure 3B:
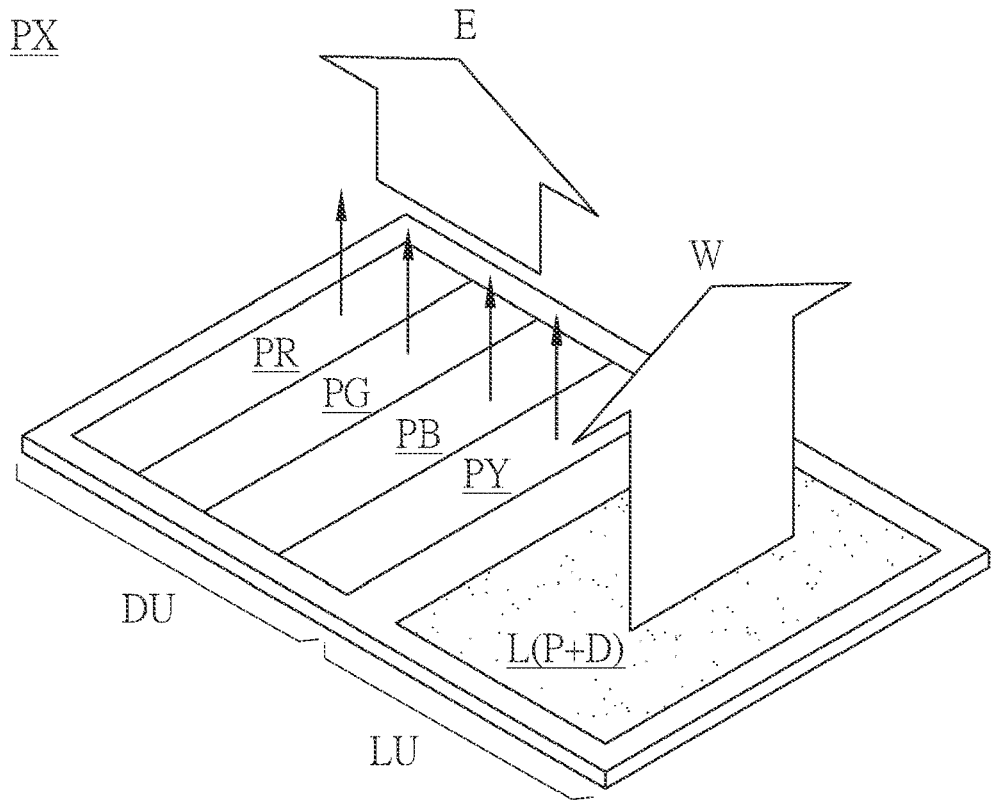
Figure 3C:
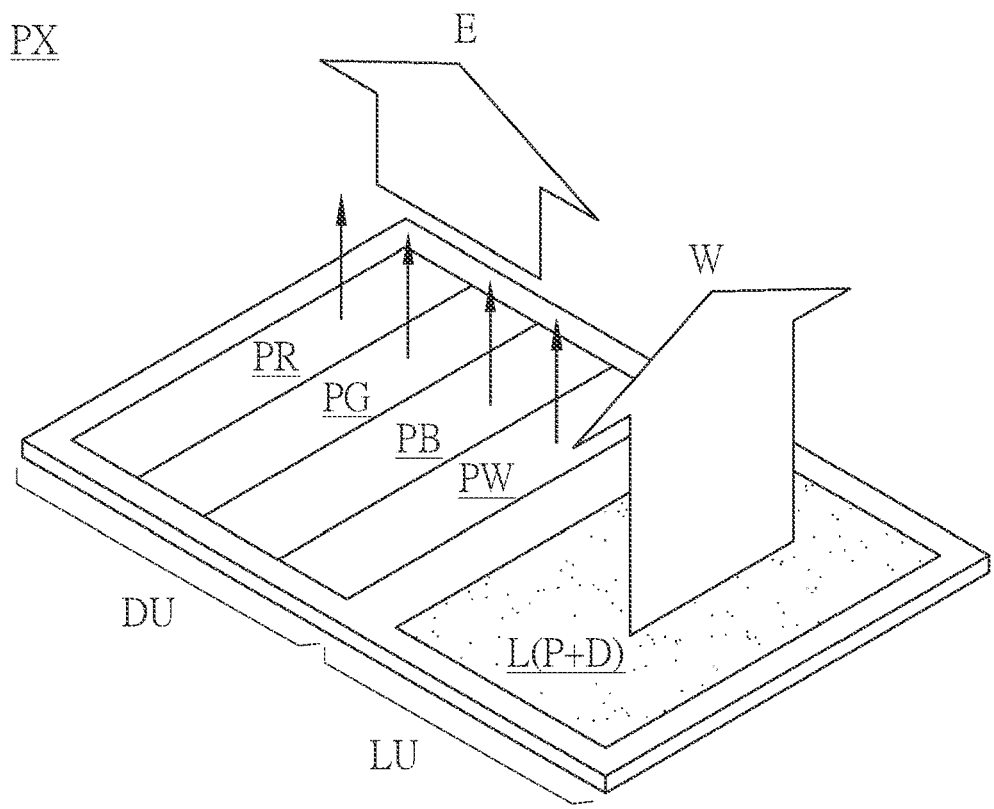

Please refer to FIG. 3A to FIG. 3C. The layout the display unit DU in each embodiment according to the present disclosure is further described in detail. Wherein, the illumination sub-pixel P of the illumination unit LU and the corresponding light orientation element D may commonly define an illumination branch L illustrated in the drawings.

According to a different embodiment of the present disclosure, the display sub-pixels of the display unit DU may have various patterns or a combination thereof. For example, the orientation of the display sub-pixels of the embodiment illustrated in FIG. 3A to FIG. 3C may be a horizontal direction which is different from the longitudinal direction illustrated in FIG. 2. Wherein, similar to the embodiment illustrated in FIG. 2 and FIG. 3, the present embodiment may have the display sub-pixel PR configured to display the red display light, the display sub-pixel PG configured to display the green display light, and the display sub-pixel PB configured to display the blue display light. In addition, the embodiment illustrated in FIG. 3B may further include a display sub-pixel PY configured to display a yellow display light in addition to the display sub-pixel PR, the display sub-pixel PG and the display sub-pixel PB. And the embodiment illustrated in FIG. 3C may further include a display sub-pixel PW configured to display a white display light in addition to the display sub-pixel PR, the display sub-pixel PG and the display sub-pixel PB. Thus, in each embodiment according to the present disclosure, the display sub-pixels disposed in the display unit DU have various types and various arrangements. And the present disclosure is not limited to the embodiment illustrated in detail.

In the embodiments illustrated in FIG. 3A to FIG. 3C, the display sub-pixel PW is a sub-pixel configured to display white display light and has no corresponding light orientation element and no specific directivity. On the other hand, the illumination sub-pixel P is disposed corresponding to the light orientation element D so as to commonly form an illumination branch L having a predetermined directivity. Therefore, in a different embodiment, the illumination branch L may emit light of any color such as white light, orange light, blue light, and so on. And the illumination light W from the illumination branch L is guided by the light orientation element D and has a specific directivity, so that it may be projected on the ground or any surface with an expected angle and/or distance.

As mentioned above, according to the present embodiment, a light (the illumination light W) can be projected and an expected screen can be displayed (the display light E). Furthermore, according to the present embodiment, one of the at least one illumination sub-pixels P with respect to the at least one display sub-pixels PR, PG, PB, PY or PW, and the other illumination sub-pixel P can be switched on or off independently. That is, regardless of whether the other pixels are switched on or off, any one of the illumination sub-pixel P can be switched on or off independently. For example, it can be controlled by input command or signals respectively and independently. Any one of the illumination sub-pixels P can be switched on to project the light or switched off to stop the light projection when the display sub-pixels PR, PG, PB, PY or PW are displayed. It can also be switched on to project the light or switched off to stop the light projection when the display sub-pixels PR, PG, PB, PY or PW are not displayed. In addition, any one of the illumination sub-pixels P can be switched on or off selectively and independently when the other illumination sub-pixels P are switched on or switched off.

Since each of the illumination branches L defined by the illumination sub-pixels P and the corresponding light orientation elements D has a different directivity, the different directivities of the illumination light W can be comprehensively realized by the switching of the specified illumination branch L (turning on and off the specified illumination sub-pixels P) and the combination thereof. In addition, since displaying and illuminating are conducted independently, the display screen will not be affected by the switching of the illumination and can display the screen and project the illumination independently.

In the display device 10 illustrated in FIG. 1 to FIG. 3C, the pixels PX merely represent reference layouts of the illumination unit LU and the display unit DU. Specifically, according to some embodiments, layouts of the pixels PX do not need to be clearly defined, and the display panel 1000 of the display device 10 may have the display surface S10, a plurality of illumination units LU, and a plurality of display units DU disposed corresponding to the plurality of illumination units LU. In that case, the number of the illumination unit LU and the number of the display unit DU may be different. For example, the display units DU can have one more row than the illumination unit LU or vice versa. However, similar to the embodiments illustrated in FIG. 1 to FIG. 3C, in another embodiment in which the number of the illumination units LU and the number of the display units DU are different, each of the plurality of illumination units LU may have at least one illumination sub-pixel P and at least one light orientation element D respectively and correspondingly disposed on the at least one illumination sub-pixel P. And the illumination light W from the illumination sub-pixel P may be directly or indirectly emitted from the display surface S10 through the light orientation element D. In addition, similarly, each of the plurality of display units DU may have at least one display pixel such as the display sub-pixels PR, PG, PB, PW, and PY, and the display light E from the display sub-pixel may be directly or indirectly from the display surface S10.

Another embodiment according to the present disclosure is further described in accordance with the patterns in which the pixels PX are the units configured to dispose the illumination unit LU and the display unit DU.

Figure 4:
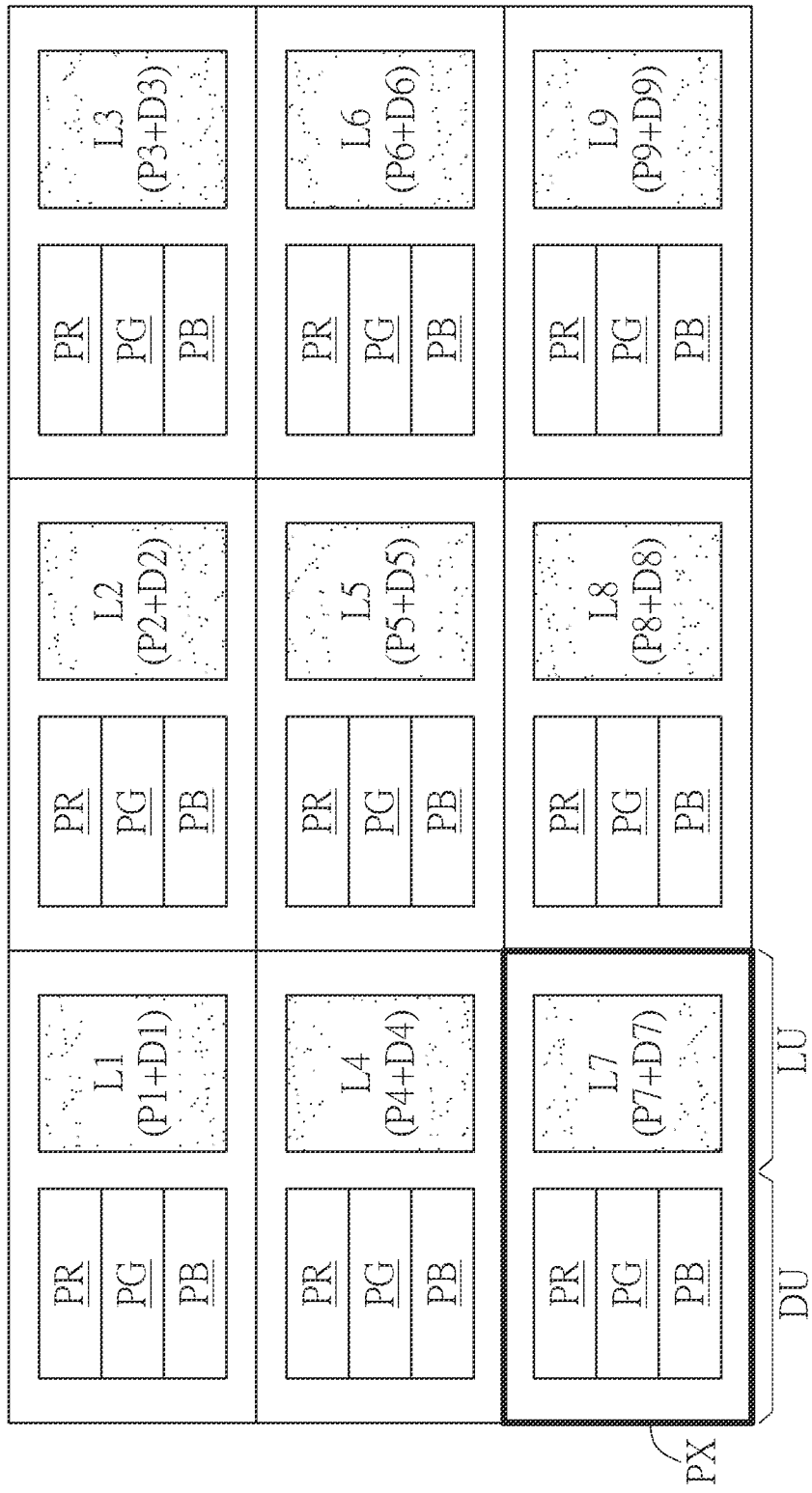
FIG. 4 is a diagram of a pixel layout when the illumination is in a unit high throughput mode in an embodiment according to the present disclosure.

Please refer to FIG. 4, wherein, similar to the situation illustrated in FIG. 2, at least some of the pixels PX include the display unit DU and the illumination unit LU. And the display unit DU includes a plurality of display sub-pixels PR, PG, and PB; and the illumination unit LU merely includes a single illumination branch (that is, it merely includes a single illumination sub-pixel). For example, the plurality of pixels PX may include the illumination branches L1, L2, L3, L4, L5, L6, L7, L8 and L9 respectively having different light orientation elements D1, D2, D3, D4, D5, D6, D7, D8 and D9. And the illumination sub-pixels in each of the illumination branches L1 to L9 can be controlled to be switched on or off with respect to the illumination sub-pixels in another illumination branches L1 to L9. In the present embodiment, since a plurality of the display sub-pixels correspond to only one illumination branch, the illumination light projected from the single illumination branch may have a higher unit luminous flux. For example, the illumination light projected from one of the pixels PX may have higher brightness or intensity so as to increase unit luminous flux of the single pixel PX. In addition, in the present embodiment, losses at the junctions between the illumination branches L1 to L9 may also be decreased. Furthermore, the designs of the corresponding light orientation element D1 to D9 can be simplified.

Figure 5:
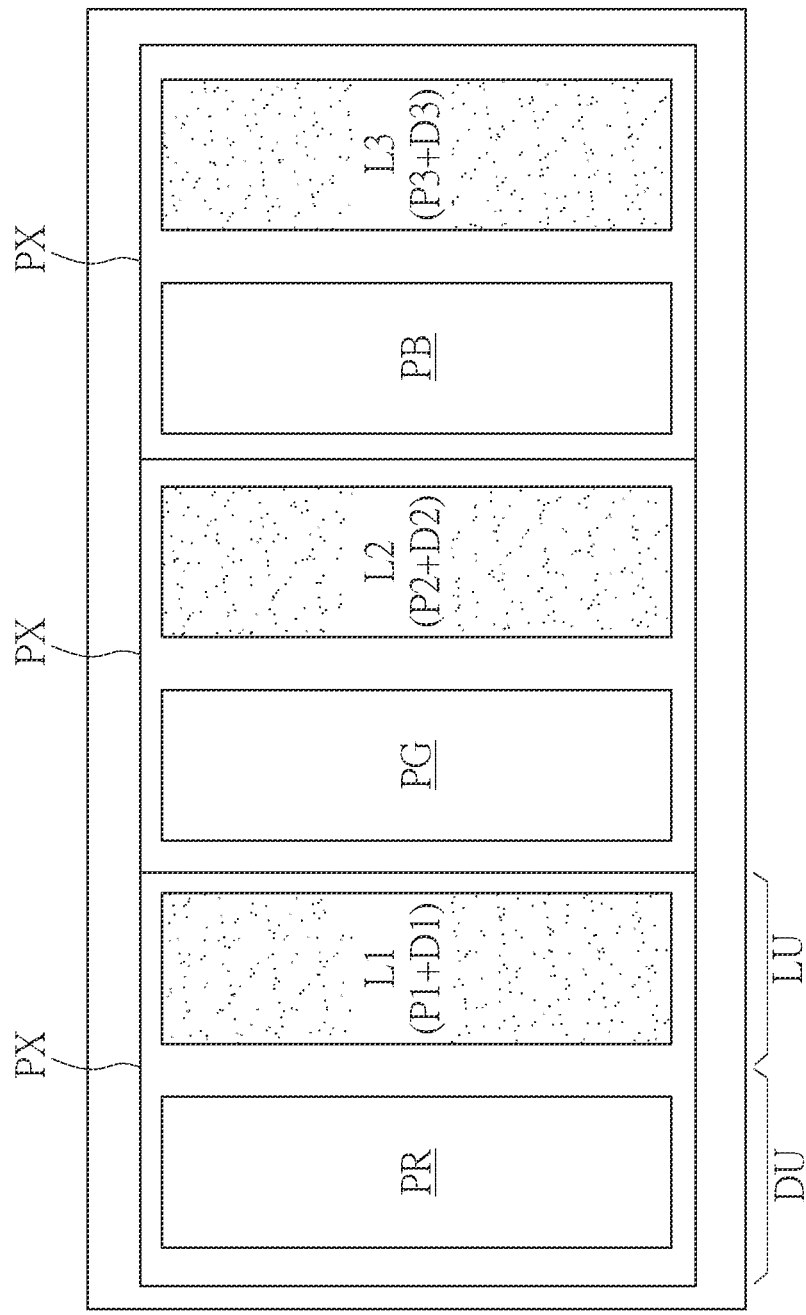
FIG. 5 is a diagram of a pixel layout in a uniform mode in an embodiment according to the present disclosure.

Please refer to FIG. 5. In another embodiment according to the present disclosure, at least some of the pixels PX include the display unit DU and the illumination unit LU. And the display unit DU includes only one display sub-pixel such as the display sub-pixel PR, PG or PB; and the illumination unit LU includes only one illumination branch (that is, it includes only one illumination sub-pixel), such as the illumination branches L1, L2 or L3 having different light orientation elements D1, D2 and D3. The illumination sub-pixels P1, P2 and P3 in each of the illumination branches L1, L2 and L3 can be controlled to be switched on or off independently with respect to the illumination sub-pixels P1, P2 and P3 in another illumination branch L1, L2 or L3. Therefore, since each display sub-pixel corresponds to an illumination branch, and the display sub-pixels and the illumination branches are interlaced, a dark band may form between the display screens by decreasing the turning on of a plurality of illumination sub-pixels when displaying. Therefore, the present embodiment can distribute the effects of displaying and illumination more homogeneously.

Figure 6A:
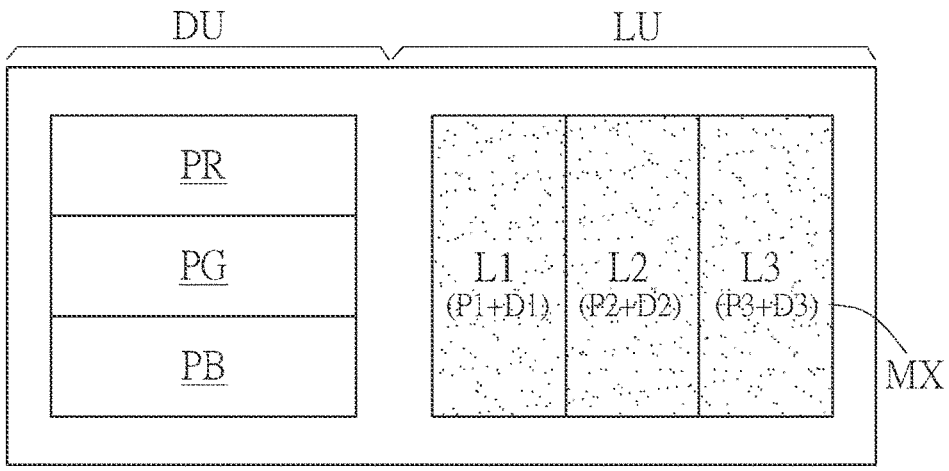
FIG. 6A to FIG. 6C are diagrams illustrating layouts of the illumination array of the pixel in each embodiment according to the present disclosure.
Figure 6B:
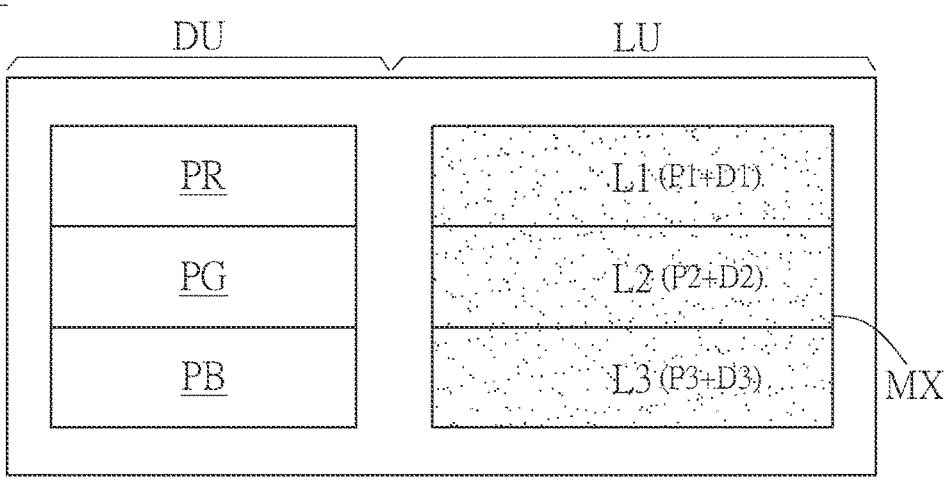
Figure 6C:
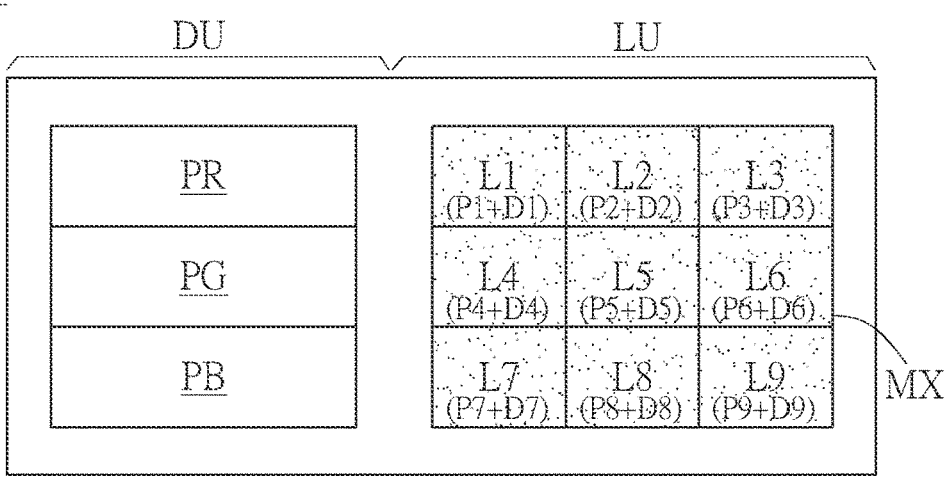

Please refer to FIG. 6A to FIG. 6C. In some embodiments according to the present disclosure, at least some of the pixels PX include the display unit DU and the illumination unit LU. And each of the illumination unit LU includes an illumination matrix MX formed by combining a plurality of illumination sub-pixels such as the illumination sub-pixels P1 to P9 (which, together with the corresponding light orientation element such as the light orientation element D1 to D9, form the illumination branches L1 to L9 respectively). Wherein the illumination matrix MX can be arranged in three blocks along a horizontal direction from left to right as shown in FIG. 6A, or arranged in three blocks along a longitudinal direction from up to down as shown in FIG. 6B, or arranged to form a nine-square division as shown in FIG. 6C.

Similar to other embodiments, each of the illumination sub-pixels in the illumination matrix MX (such as the illumination sub-pixel P1) can be controlled to be switched on or off independently with respect to another illumination sub-pixel (such as the illumination sub-pixels P2 to P9). That is, one of the illumination sub-pixels (such as the illumination sub-pixel P1) can be controlled to be switched on or off independently with respect to another illumination sub-pixels (such as the illumination sub-pixels P2 to P9) in the same pixel PX.

Here, the illumination sub-pixels forming the illumination matrix MX may include at least the first illumination sub-pixel P1 and the second illumination sub-pixel P2. And at least one light orientation element may include the first light orientation element D1 on the first illumination sub-pixel P1 corresponding to the first illumination sub-pixel P1 and the second light orientation element D2 disposed on the second illumination sub-pixel P2 corresponding to the second illumination sub-pixel P2. Wherein the first light orientation element D1 and the second light orientation element D2 may have different pointing directions, so that the light emitted from the first illumination sub-pixel P1 and the light emitted from the second illumination sub-pixel P2 have different exit angles or exit directions from the display panel 1000. For example, the illumination light can be emitted at a different angle of deflection in the longitudinal direction (elevation angle or depression angle), a different angle of deflection in the horizontal direction, or a combination thereof.

Figure 7A:
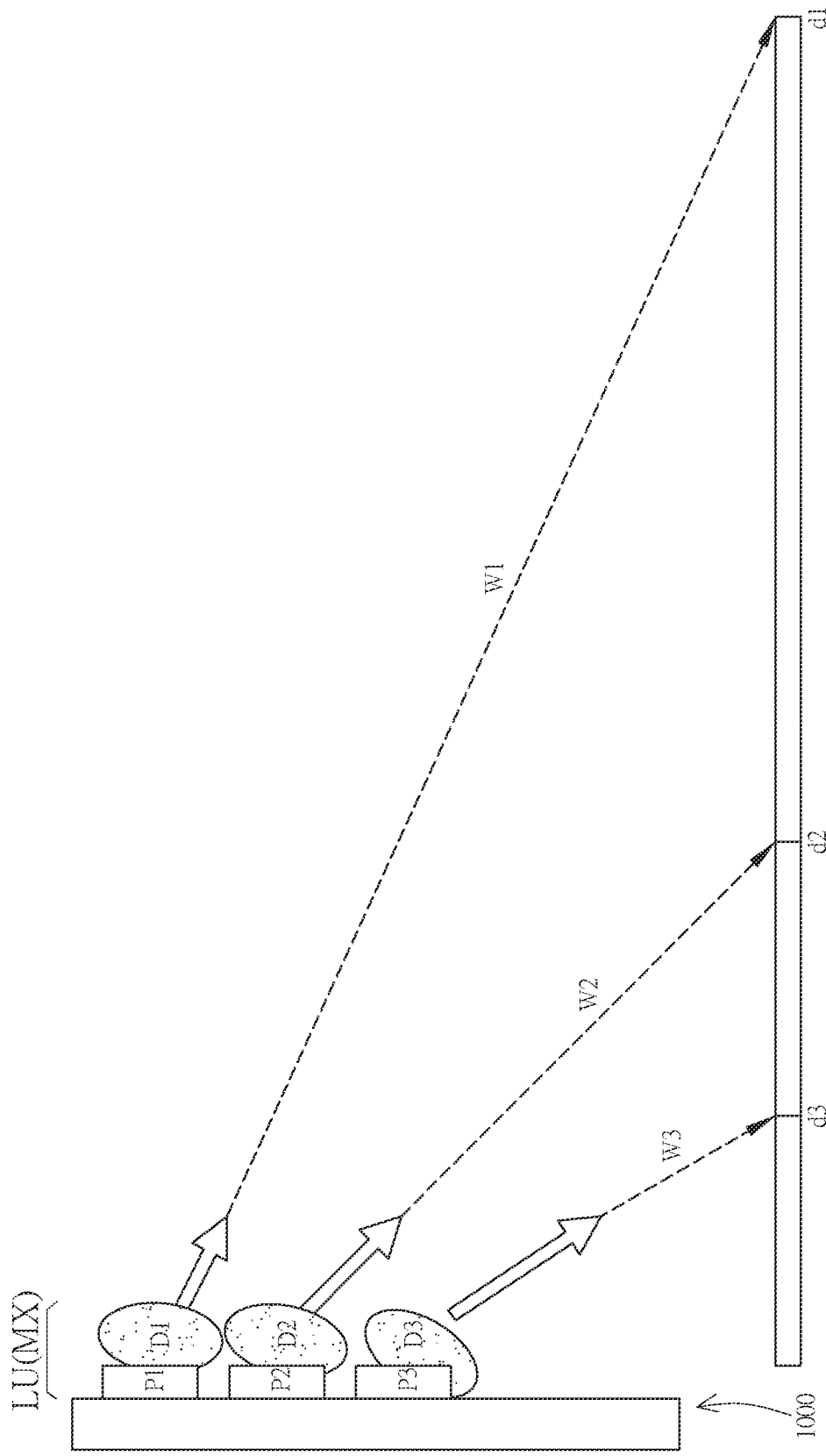
FIG. 7A is a diagram illustrating a projection of illumination light emitted by an illumination array of the illumination unit of the pixel after being oriented by the light orientation element in an embodiment according to the present disclosure.

Thus, the light emitted by the illumination sub-pixels disposed on each of the illumination matrix MX has different directionalities after passing through each of the light orientation elements. For example, please refer to FIG. 7A together with FIG. 6B. According to the embodiment illustrated in FIG. 6B and FIG. 7A, in an illumination matrix MX, the light orientation element may include the first light orientation element D1, the second light orientation element D2 and the third light orientation element D3 respectively guiding the illumination light W1, W2 and W3 emitted by the illumination sub-pixel P1, P2 and P3 based on different angles. For example, as shown in FIG. 7A, the illumination light W1 may be emitted at a greater angle with respect to the display surface of the display panel 1000, so that the light is projected to a location distance d1 away from the display panel 1000. In addition, the illumination light W3 may be emitted at a smaller angel with respect to the display surface of the display panel 1000, so that the light is projected to a location distance d3 away from the display panel 1000. Finally, the illumination light W2 may be emitted at an angel whose angel size is between the aforementioned angles with respect to the display surface of the display panel 1000, so that the light is projected to a location distance d2 away from the display panel 1000. Wherein distance d1>distance d2>distance d3. One can see that the greater the emergence angle with respect to the display surface of the display panel 1000, the greater the distance between the projected location and the display panel 1000. As such, the display panel 1000 according to the embodiment illustrated in FIG. 7A, for example, may be hung on the wall of a house environment and project light similar to sunlight on the floor; in addition, the distance of the projection light can be changed according to the time of the day (for example, first the distance d1, then the distance d2, and last the distance d3) so as to create effects of natural light changing with the progression of time. However, such usage and application mode merely represent an example. The present disclosure is not limited thereto.

Figure 7B:
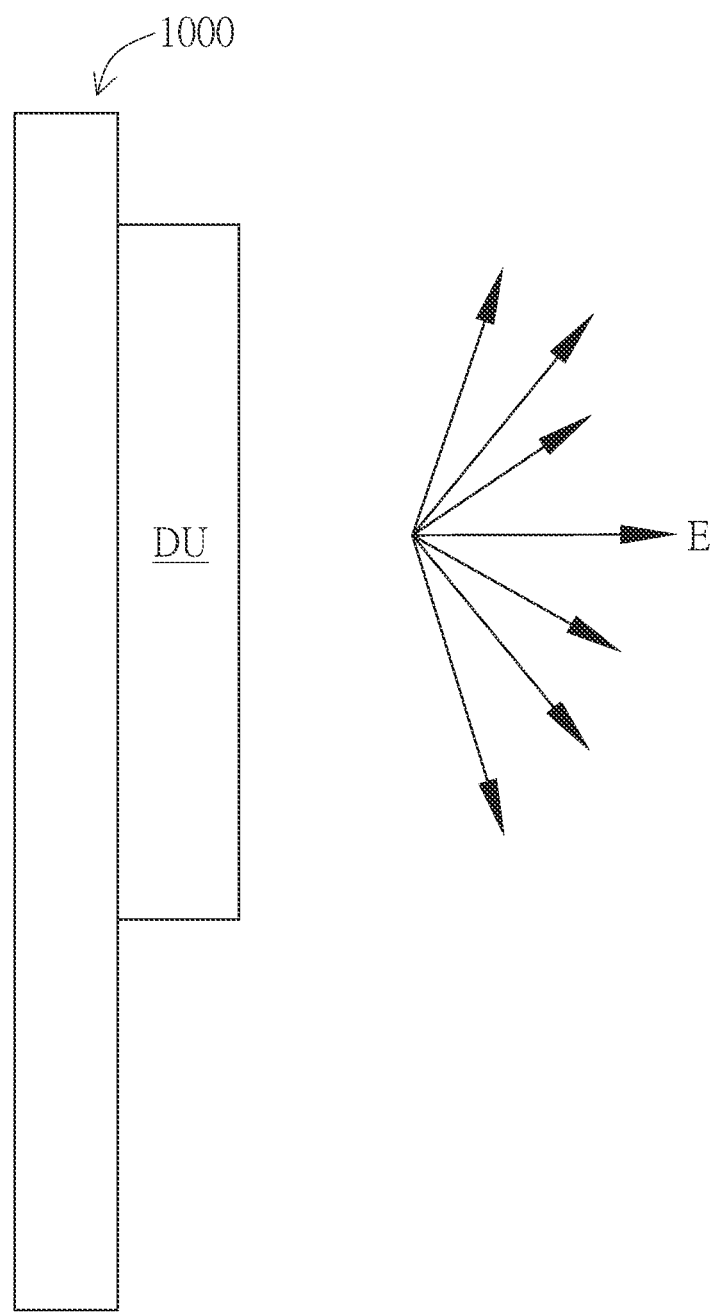
FIG. 7B is a diagram illustrating the display light emitted by the display unit of the pixel in an embodiment according to the present disclosure.

In contrast, please refer to FIG. 7B together with FIG. 6B. The display unit DU may not have a specific directionality compared to the illumination unit LU. For example, it may have omnidirectionality or at least broad directionality, and viewers at most angles in front of the display panel 1000 can view the emitted display light E being displayed.

Figure 7C:
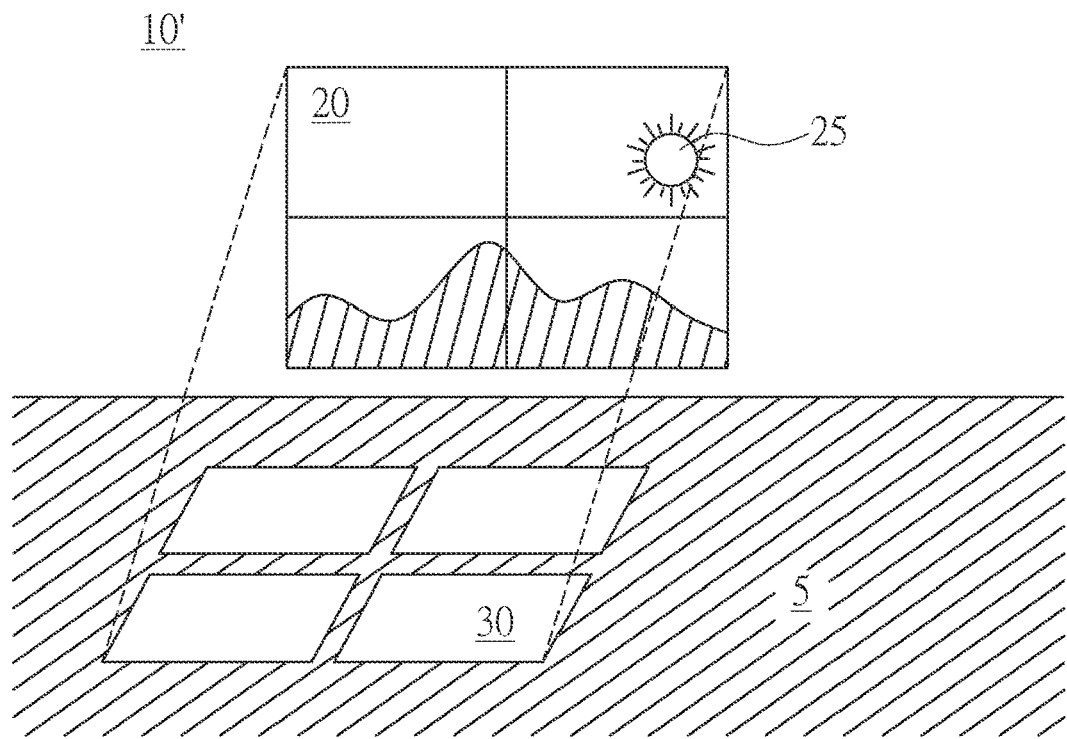
FIG. 7C is a diagram illustrating the display device displaying a window view and projecting window light in an embodiment according to the present disclosure.

As mentioned above, according to each of the aforementioned embodiments, different light orientation elements can respectively guide the illumination light from each of the illumination sub-pixels to the same or different directions and can selectively turn on or off the illumination sub-pixels individually. Therefore, in the case that the display is not obstructed, the light can be projected expectedly so as to satisfy the predetermined demand. For example, please refer to FIG. 7C. According to an embodiment, a display device 10' may have the architecture mentioned in one of the embodiments. And when disposed indoors, the display unit can selectively simulate a window view 20 by displaying an expected image, so that the viewers at most angles in front of the display device 10' can view the simulated window view 20. At the same time, the illumination unit of the display device 10' can conduct the directional guiding so as to project the light at a specific angle to a location (such as ground 5) to simulate window light 30, so that the viewers can feel the natural light passing through the window to enter the indoor. For example, the location of a sun 25 displayed by the window view 20 can be disposed on purpose so as to create the effect of the sun 25 projecting the light entering the indoor. As such, a window can be simulated more lively.

Figure 7D:
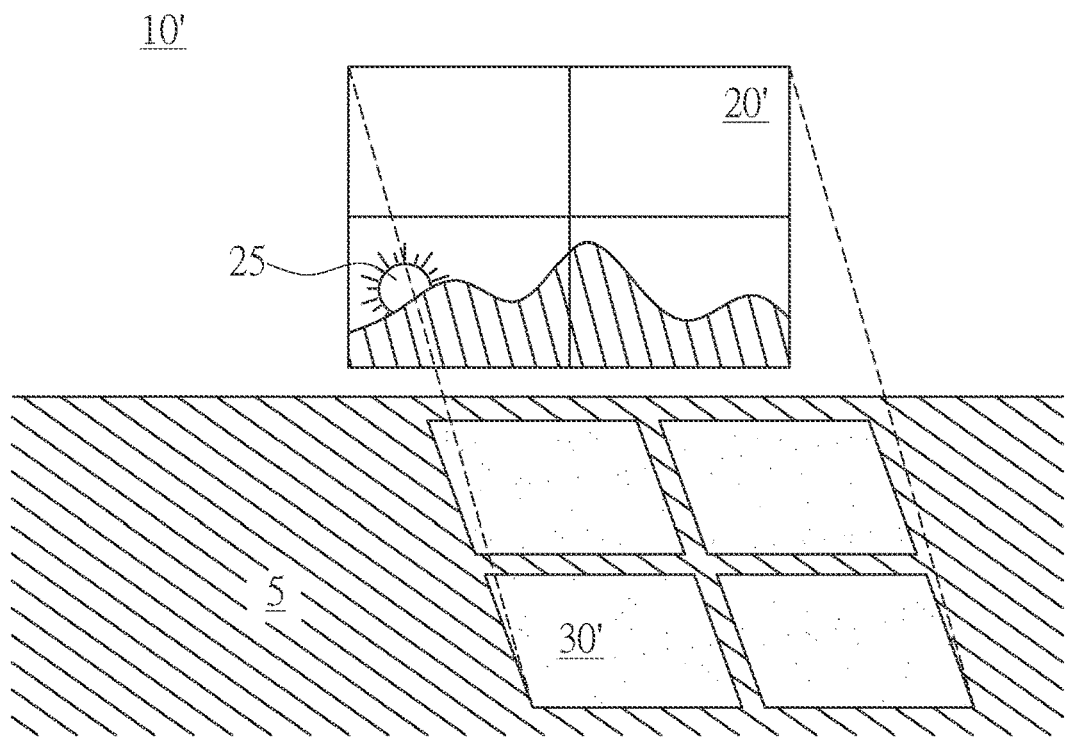
FIG. 7D is a diagram illustrating the display device displaying the window view and projecting the window light in another embodiment according to the present disclosure.

Please refer to FIG. 7D. Similar to the effect of FIG. 7C, the display device 10' may change the content displayed by the display unit along the changing of time and switch on or off the different illumination sub-pixels (the illumination branch) having different directionalities so as to change the specific angles and the locations that the illumination light is projected. For example, the window view 20' displayed by the display unit can be changed to the setting of the sun 25 and the directionality of the window light 30' projected by the illumination light can be different from or opposite to FIG. 7C so as to simulate the variation of natural light after the sun 25 moves from east to west.

Then, the variation of the illumination light can be adjusted according to the expression of natural light at various time periods based on the various properties of natural light. For example, the directionalities of the illumination light can be adjusted based on the common sense that the shadows from window light of sunrise and sunset are longer, the shadow from window light of noon time is shorter, and the shadow from widow light of morning and afternoon is in the middle and the like so as to simulate natural light of various properties.

In some embodiments, the effect of a cloudy day or night can be also created by switching off a part of or all the illumination sub-pixels (the illumination branch). Then, people skilled in the art can adjust the illumination sub-pixels (the illumination branch) freely in accordance with the mentioned principles so as to achieve the needed effects.

Furthermore, according to the demand and the usage environment, the light projected by the illumination unit of the display device 10 may change other light properties such as color temperature in addition to directionalities. For example, please refer to FIG. 8. In an embodiment according to the present disclosure, the pixels PX may have a display unit DU and a illumination unit LU. The illumination unit LU includes the illumination matrix MX. Wherein the illumination sub-pixels forming the illumination matrix MX may include illumination sub-pixels having different color temperatures. For example, the illumination sub-pixels P1 to P9 forming the illumination matrix MX include a first illumination sub-pixel P1, a fourth illumination sub-pixel P4, and a seventh illumination sub-pixel P7 all having a first color temperature C1; a second illumination sub-pixel P2, a fifth illumination sub-pixel P5, and an eight illumination sub-pixel P8 all having a second color temperature C2; and a third illumination sub-pixel P3, a sixth illumination sub-pixel P6, and a ninth illumination sub-pixel P9 all having a third color temperature C3.

Figure 8:
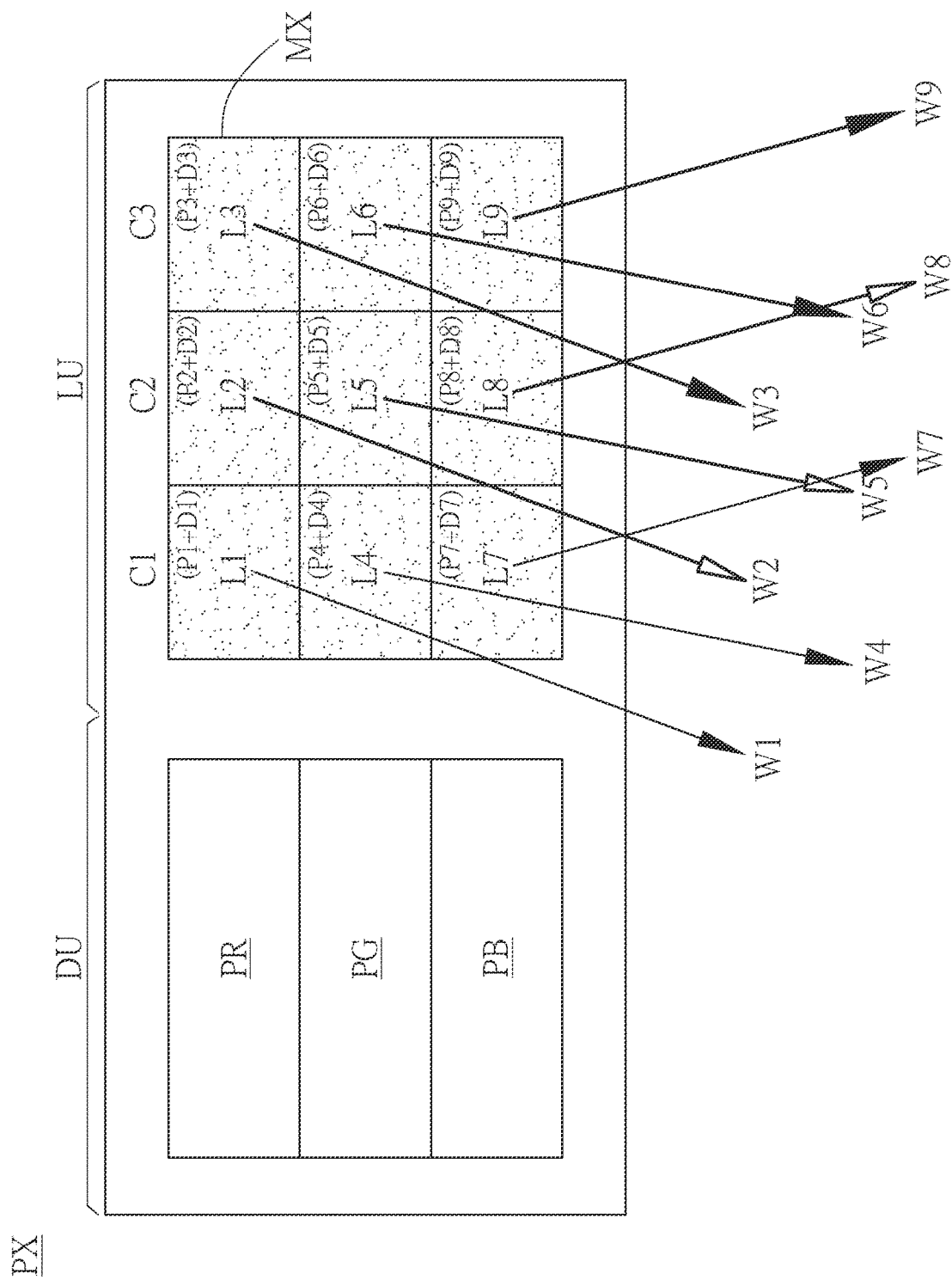
FIG. 8 is a diagram of the illumination array of the illumination sub-pixel having different color temperatures in the pixel in an embodiment according to the present disclosure.

Hence in the embodiment illustrated in FIG. 8, the first color temperature C1, for example, may be a low color temperature, the second color temperature C2, for example, may be a middle color temperature, and the third color temperature C3, for example, may be a high color temperature. In addition, in some embodiments, the color temperatures can be adjusted by changing the light emitting properties of the illumination sub-pixels or by adjusting the propertied of the color filters of the illumination sub-pixels such as doping coloring materials. However, the aforementioned are merely represent examples, and the present disclosure is not limited thereto.

Hence, a plurality of sub-pixels having the same color temperature can be configured to emit light toward different pointing directions. For example, by disposing the light orientation elements D1, D4 and D7, the first illumination sub-pixel P1, the fourth illumination sub-pixel P4 and the seventh illumination sub-pixel P7 all having the first color temperature C1 can respectively emit the illumination light W1, W4 and W7 toward different directions. By disposing each of the light orientation elements D2, D5 and D8, the second illumination sub-pixel P2, the fifth illumination sub-pixel P5 and the eighth illumination sub-pixel P8 all having the second color temperature C2 can respectively emit the illumination light W2, W5 and W8 toward different directions. By disposing each of the light orientation elements D3, D6 and D9, the third illumination sub-pixel P3, the sixth illumination sub-pixel P6 and the ninth illumination sub-pixel P9 all having the third color temperature C3 can respectively emit the illumination light W3, W6 and W9 toward different directions.

Figure 9A:
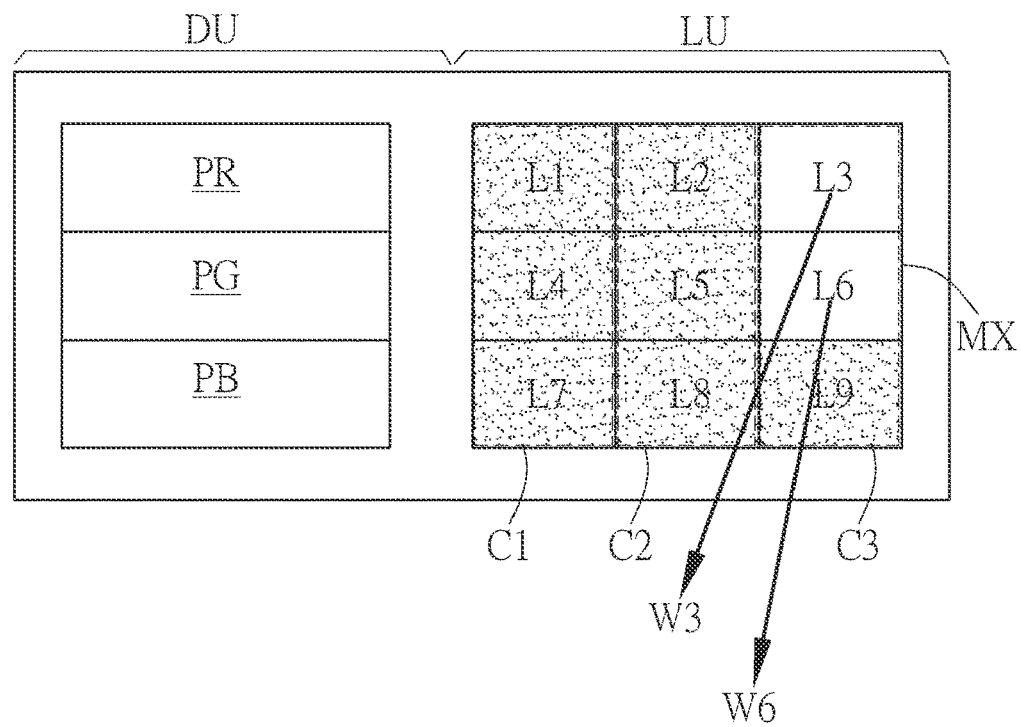
FIG. 9A and FIG. 9B are light diagrams illustrating the pixel in FIG. 8 projected in different modes.
Figure 9B:
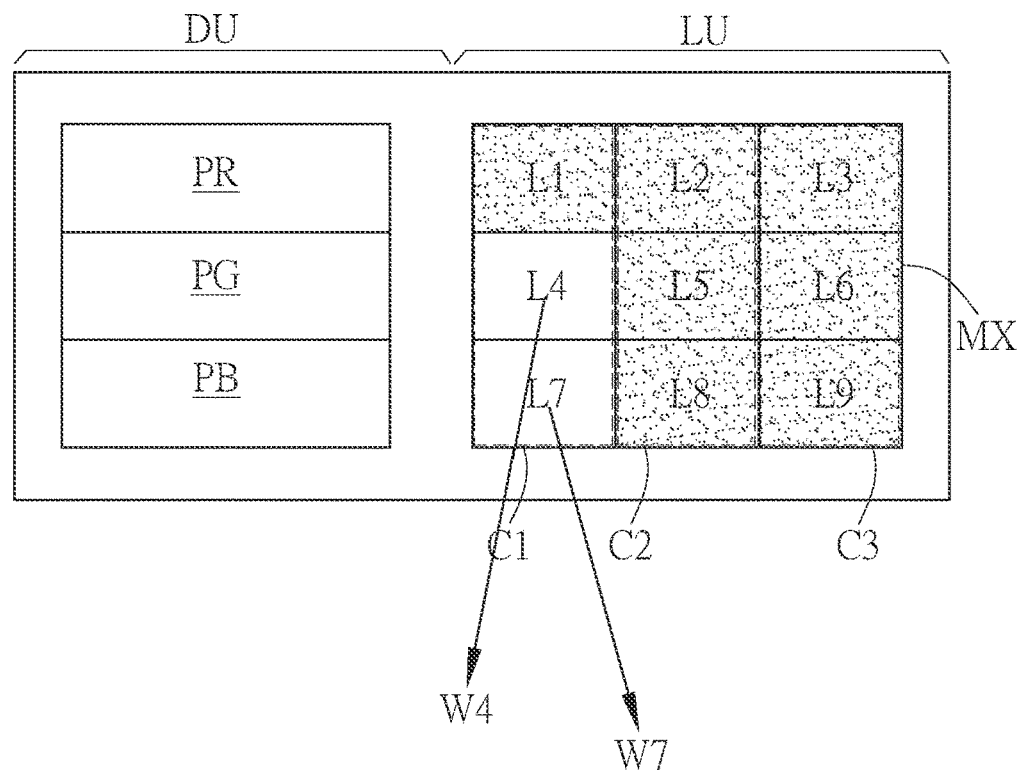

According to the aforementioned layouts, each of the illumination branches L1 to L9 of the illumination matrix MX in the illumination unit LU of the present embodiment can determine the color temperature properties and directionalities of the projected illumination light W1 to W9 in accordance with the color temperature properties if the illumination sub-pixel P1 to P9 and the directionalities of the light orientation element D1 to D9. For example, please refer to FIG. 9A together with FIG. 8. In the morning, the other illumination branches can be selectively switched off and only the illumination branches L3 and L6 are switched on. Therefore, the illumination branches L3 and L6, for example, having higher third color temperature C3 (such as cool colors) and the directionality from right to left, can project the illumination light W3 to W6 respectively so as to create a noonday feel such as when the sunlight has a high color temperature irradiating the indoor from the east. Please refer to FIG. 9B together with FIG. 8. In the evening, the other illumination branches can be selectively switched off and only the illumination branches L4 and L7 are switched on. Therefore, the illumination branches L4 and L7, for example, having lower first color temperature C1 (such as warm colors) can project the illumination light W4 and W7 respectively so as to create an evening feel such as the sunlight of a sunset in the west having the low color temperature projected in the indoor. Hence people skilled in the art can understand that the display device in each embodiment according to the present disclosure can be configured to simulate various situational light or natural light with reference to the aforementioned descriptions. And other detailed examples are not described herein again.

As mentioned above, the illumination branches L1 to L9 having different color temperatures are arranged in different rows (or different columns or alternately arranged). Adjustable color temperatures of the projection of the display device can be realized by adjusting the proportion between the high and low color temperatures and selectively switching on the different illumination branches L1 to L9.

In the aforementioned embodiment, properties such as color temperatures can be adjusted using the illumination pixels; however, in another embodiment according to the present disclosure, properties such as color temperatures can also be varied by adjusting the inside of the light orientation element corresponding to the illumination sub-pixel. For example, specific materials can be doped in the light orientation element, so that properties such as color temperatures can also be varied when light passes through the light orientation element and its directionality is guided. However, the present disclosure is not limited to the embodiments described herein in detail.

Figure 10:
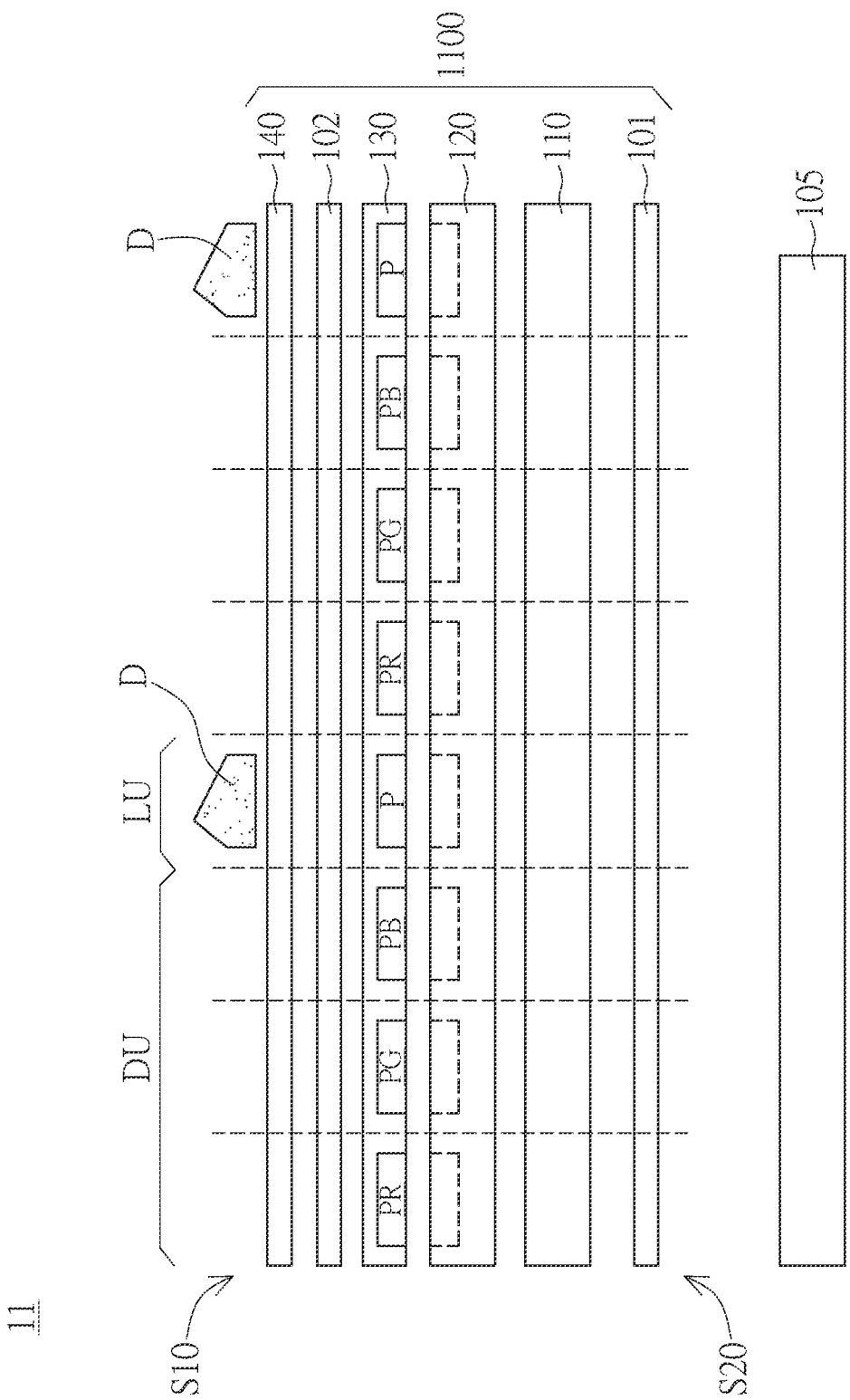
FIG. 10 is a cross-section diagram of the display device when a self-luminous display device is used in an embodiment according to the present disclosure.

All the aforementioned embodiments providing the illumination unit LU and the display unit DU can be realized by various structures of the display device. For example, the display device may be a non-light-emitting display device. And at least one illumination sub-pixel P and at least one display sub-pixel such as the display sub-pixels PR, PG and PB are respectively formed by a light adjustable layer inside the display panel. For example, please refer to FIG. 10. A display device 11 of an embodiment according to the present disclosure may have a display panel 1100 similar to the display panel 1000 in the aforementioned embodiment and a backlight source 105 disposed on the back side S20 of the display panel 1100 opposite to the display surface S10. The display panel 1100 may include a lower polarizer 101, a substrate glass 110 on which a thin film transistor is disposed, a display liquid crystal layer 120 on which an alignment liquid crystal molecular is disposed, a cover plate glass 130 having a color polarizer and the like, an upper polarizer 102 and a selectively disposed protective glass 140. In the present embodiment, at least one illumination sub-pixel P and at least one display sub-pixel such as the display sub-pixels PR, PG or PB consist of the display liquid crystal layer 120 in the display panel 1100 and the cover plate glass 130 having a color polarizer. The sub-pixels provide a light source by the backlight source 105 and emit light having properties of each of the sub-pixels through the pre-arranged liquid crystal molecular and the color filter layer.

Figure 11:
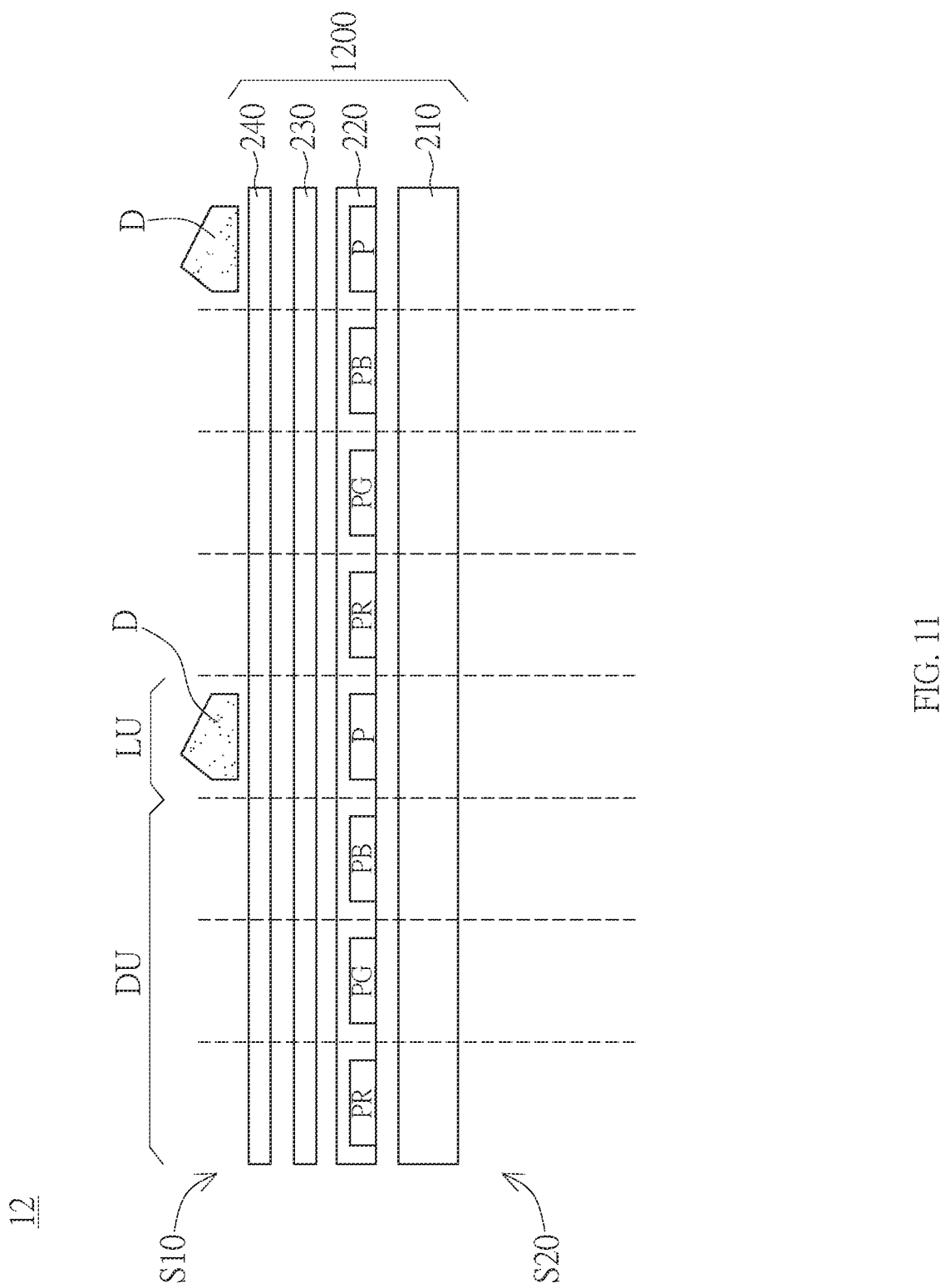
FIG. 11 is a cross-section diagram of the display device when a non-self-luminous display device is used in an embodiment according to the present disclosure.

In addition, the display device may also be a self-luminous display device. And at least one illumination sub-pixel and at least one display sub-pixel may be self-luminous light sources respectively. For example, please refer to FIG. 11. The display device 12 of an embodiment according to the present disclosure may have a display panel 1200 similar to the display panel 1000 in the aforementioned embodiment. The display panel 1200 may include a substrate 210, a display light-emitting layer 220, an encapsulation layer 230, and a selectively disposed protect glass 240. In the present embodiment, the display light-emitting layer 220, for example, may include self-luminous light sources such as a plurality of LEDs, Micro LEDs, mini LEDs or OLEDs and the like. And at least one illumination sub-pixel P and at least one display sub-pixels such as the display sub-pixels PR, PG and PB are such self-luminous light sources respectively. The sub-pixels are configured to emit light by themselves and to emit light having the properties of each of the sub-pixels.

In some embodiments, the light orientation element D may be disposed on a layer through which the display device is in contact with the outside such as the air environment; however, the present disclosure is not limited thereto. Taking the display devices 11 and 12 for examples, the light orientation element D is disposed on a layer through which the display devices 11 and 12 are in contact with the air. However, they merely represent examples. And under the premise that the light orientation can be achieved, the number and location of layers on which the light orientation element D is disposed are not limited thereto.

As mentioned above, patterns of pixel layout and structure designs defining the illumination sub-pixels and the display sub-pixels in the illumination unit LU and the display unit DU may have a plurality of variations. And the present disclosure is not limited to the exemplary and specifically mentioned patterns. Hence various structures and methods for constructing pixels which are conventional or which may be developed in future can be used in the pixel construction in each embodiment according to the present disclosure.

Next, the pattern of the light orientation element in an embodiment according to the present disclosure will be further described in detail.

Figure 12:
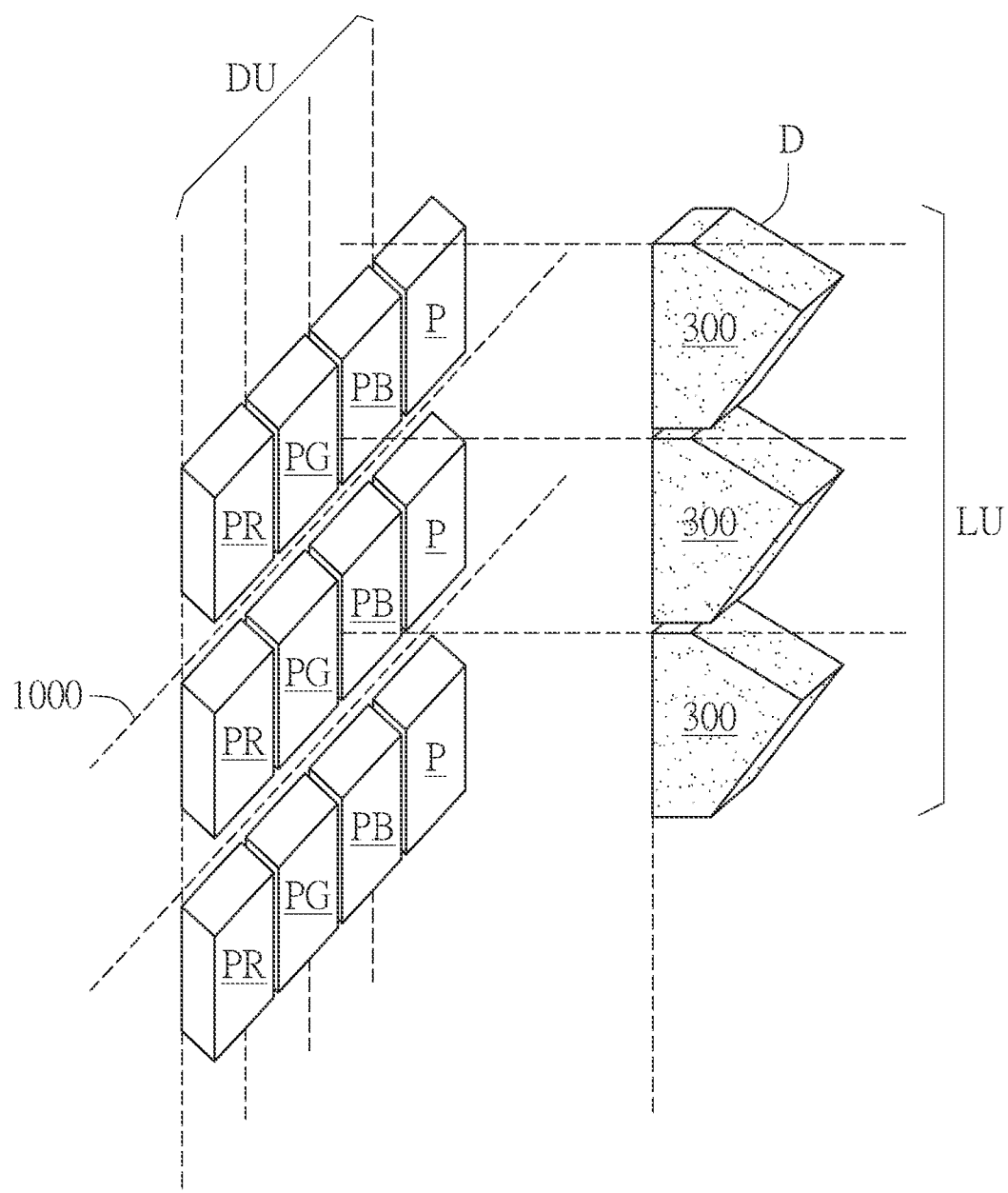
FIG. 12 is an example diagram of a lens used as the light orientation element in an embodiment according to the present disclosure.

FIG. 12 illustrates a perspective view of the illumination unit LU and the display unit DU according to an embodiment. Wherein the light orientation element D of the illumination unit LU may include a lens 300. And light emitted from the illumination sub-pixel P may be guided to a pre-determined angle or location, based on the corresponding location and configuration of the lens 300 and the corresponding illumination sub-pixel P, and the shape design of the lens 300, via the reflection and/or refractions of the lens 300.

Figure 13A:
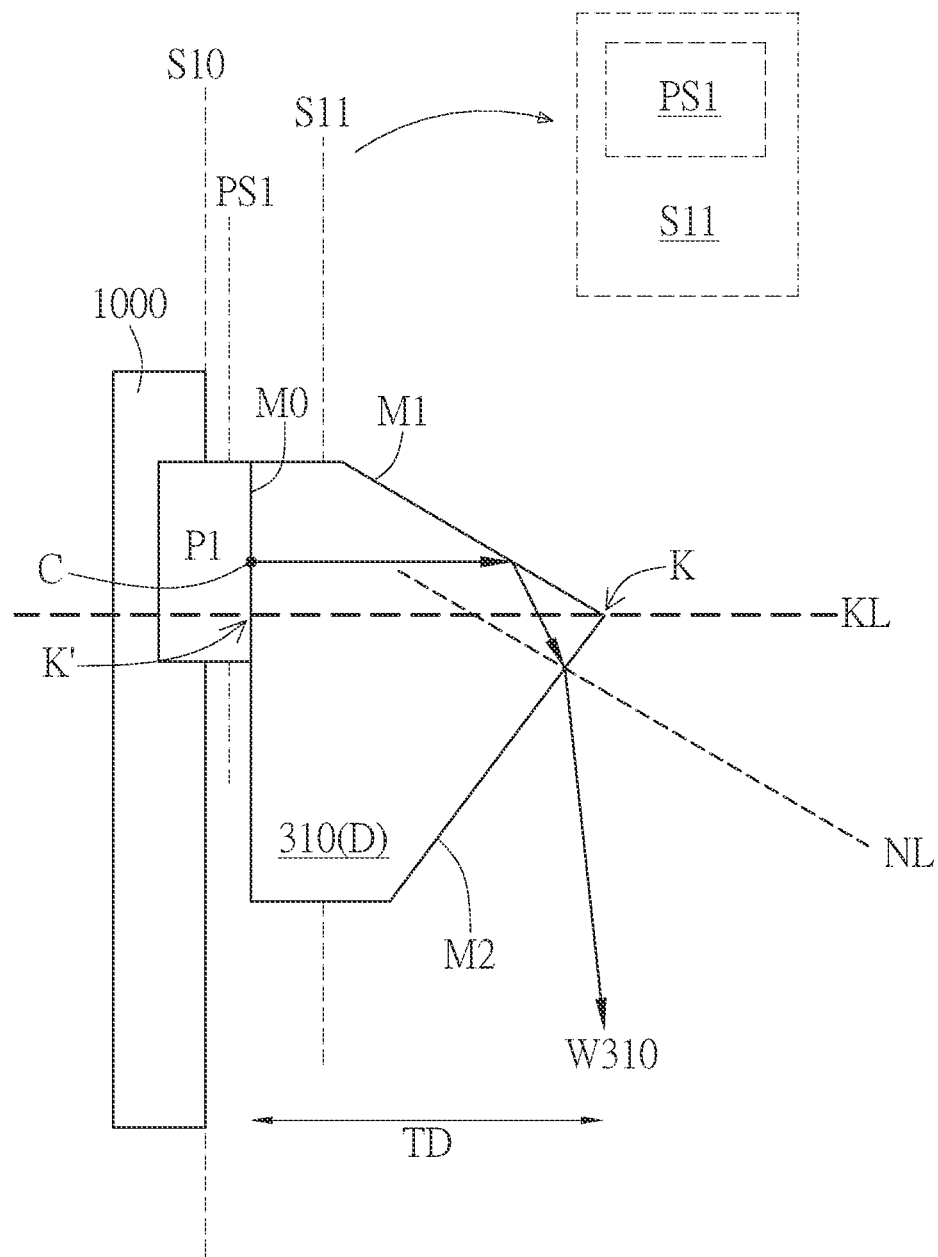
FIG. 13A to FIG. 13C are diagrams of light projection by various lenses in each embodiment according to the present disclosure.
Figure 13B:
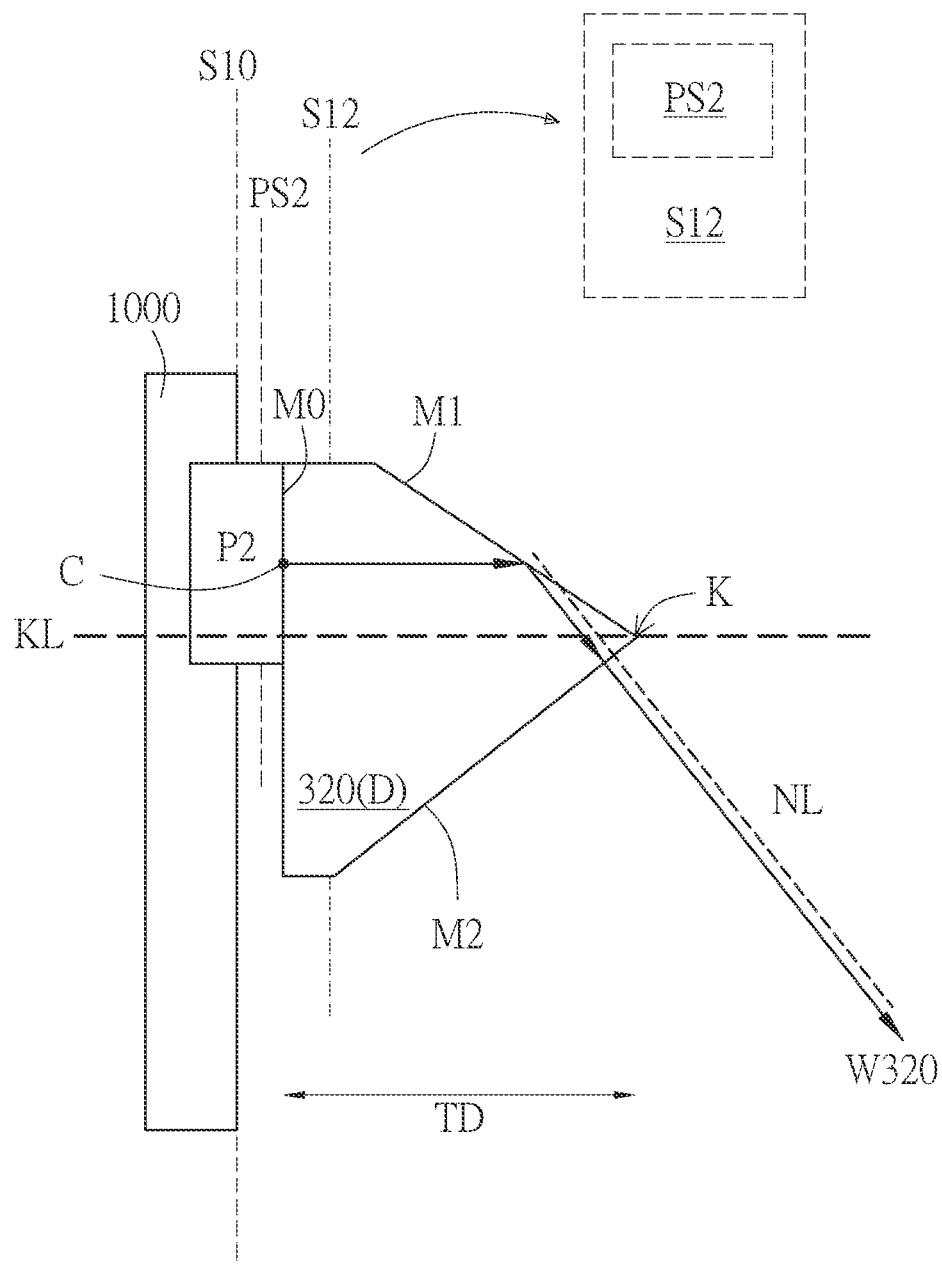
Figure 13C:
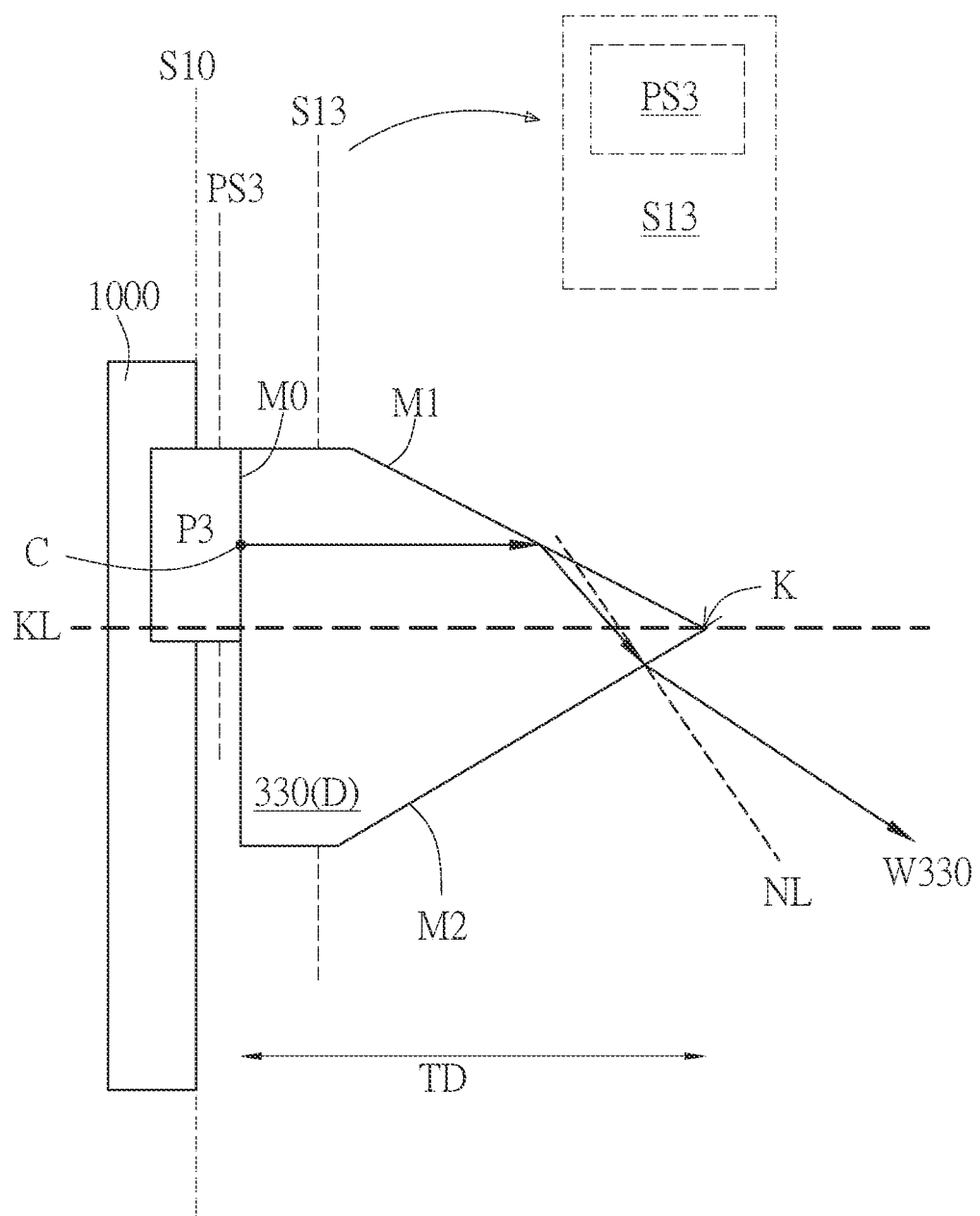

For example, together with FIG. 12, please refer to FIG. 13A to FIG. 13C illustrating various embodiments in which the light orientation elements D may be lenses 310, 320 and 330. Shapes of at least one cross-section of the lenses 310, 320 and 330 perpendicular to the display surface of the display panel 1000 may be asymmetric pentagonal prisms. Hence, as shown in the visual angles of FIG. 13A to FIG. 13C, in the case of the light orientation elements D being the lenses 310, 320 and 330, at least one cross-section of at least one of the lenses 310, 320 and 330 disposed on the display panel 1000 perpendicular to the display surface S10 of the display panel 1000 may be an asymmetric pentagonal prism. For example, cross-section cut along the thickness direction TD of the lenses 310, 320 and 330 may be asymmetric pentagonal prisms.

Here, FIG. 12 merely represents a perspective view illustrating a three-dimensional structure of the light orientation element D. In addition, the layout of the illumination sub-pixel P and the display sub-pixels PR, PG and PB illustrated in FIG. 12 merely represent an example; and various layouts of the illumination sub-pixels and the display sub-pixels described in any embodiments or implemented by the principles of the present disclosure fall into the scope of the present disclosure. Therefore, possible layout of the illumination sub-pixels and the display sub-pixels will not described in the specification and the drawings again.

Please continue to refer to FIG. 13A to FIG. 13C. According to some embodiments, maximum cross-section areas of the lenses 310 to 330 parallel to the display surface S10 of the display panel 1000 may be respectively larger than the maximum cross-section areas of the corresponding illumination sub-pixels P1 to P3 parallel to the display surface S10. For example, as shown on the right side of FIG. 13A to FIG. 13C, when the lens is projected on the display surface S10, the maximum cross-section areas S11, S12 and S13 of the lenses 310 to 330 parallel to the display surface S10 of the display panel 1000 may be respectively larger than the maximum cross-section areas PS1, PS2 and PS3 of the corresponding illumination sub-pixels P1 to P3 parallel to the display surface S10. In addition, the lenses 310 to 330 may protrude towards the corresponding illumination sub-pixels P1 to P3.

Specifically, the lenses 310, 320 and 330 may have an incident surface M0 relatively near the corresponding illumination sub-pixels P1, P2 and P3 and a first reflective surface M1 and a second refracting surface M2 facing the incident surface M0 and relatively away from the corresponding illumination sub-pixels P1, P2 and P3. Wherein the reference corner point K' perpendicularly projected from a corner point K where the first reflective surface M1 and the second refracting surface M2 intersect on the corresponding illumination sub-pixels P1, P2 and P3 diverges from the center C of the illumination sub-pixels P1, P2 and P3. That is, the lenses 310 to 330 may be disposed eccentrically with respect to the illumination sub-pixels P1 to P3.

Therefore, through the guiding of the lenses 310, 320 and 330, the light (the illumination light W310, W320 and W330) emitted by the corresponding illumination sub-pixels P1, P2 and P3 will be incident to the lenses 310, 320 and 330 from the incident surface M0 and reflected (for example, total internal reflection) by the first reflective surface M1 to be guided to a specific transmitting direction to determine an included angle between the light and the second refracting surface M2 and pass through the second refracting surface M2 so as to be diverged from the center C of the corresponding illumination sub-pixels P1, P2 and P3 and exit from the lenses 310, 320 and 330.

Specifically, when the light (the illumination light W310) emitted by the corresponding illumination sub-pixel P1 approaches the corner point K with respect to a normal line NL of the second refracting surface M2 to be incident to the second refracting surface M2 as shown in FIG. 13A when viewing along the cross-section of the lenses 310, 320 and 330 perpendicular to the display surface S10 of the display panel 1000, the light (the illumination light W310) is refracted by the second refracting surface M2 and away from the corner point K with respect to the normal line NL of the second refracting surface M2 to exit from the lens 310. Therefore, the light can be projected at a smaller angle with respect to the display panel 1000 (the downward light), and the distance of the light projection is smaller and nearer to the display panel 1000. In contrast, when the light (the illumination light W330) emitted by the corresponding illumination sub-pixel P3 is away from the corner point K with respect to the normal line NL of the second refracting surface M2 to be incident to the second refracting surface M2 as shown in FIG. 13C, the light (the illumination light W330) refracted by the second refracting surface M2 toward the corner point K with respect to the normal line NL of the second refracting surface M2 to exit from the lens 330. Therefore, the light can be projected at a larger angle with respect to the display panel 1000 (the upward light) and the distance of the light projection is farther and away from the display panel 1000. In addition, as shown in FIG. 13B, the light (the illumination light W320) reflected by the first reflective surface M1 might also be incident to the second refracting surface M2 and directly parallel to the normal line NL of the second refracting surface M2 and exit from the lens 320 directly without refraction. In that case, as opposed to FIG. 13A and FIG. 13C, in FIG. 13B, the light can be projected at a middle angle with respect to the display panel 1000 (as opposed to the light in the aforementioned two embodiments). And the distance of the light projection and the projection distance from the display panel 1000 is in between those in FIG. 13A and FIG. 13C. As such, in some embodiments, the smaller the included angle between the first reflective surface M1 and the second refracting surface M2 of the lens, the farther the illumination light is emitted through the lens.

Preferably, total internal reflection of the light can occur on the first reflective surface M1 and the light can be guided to exit from the second refracting surface M2 with decreased light loss.

Next, the sizes and the angles of the lenses in each embodiment according to the present disclosure will be further described.

Figure 14:
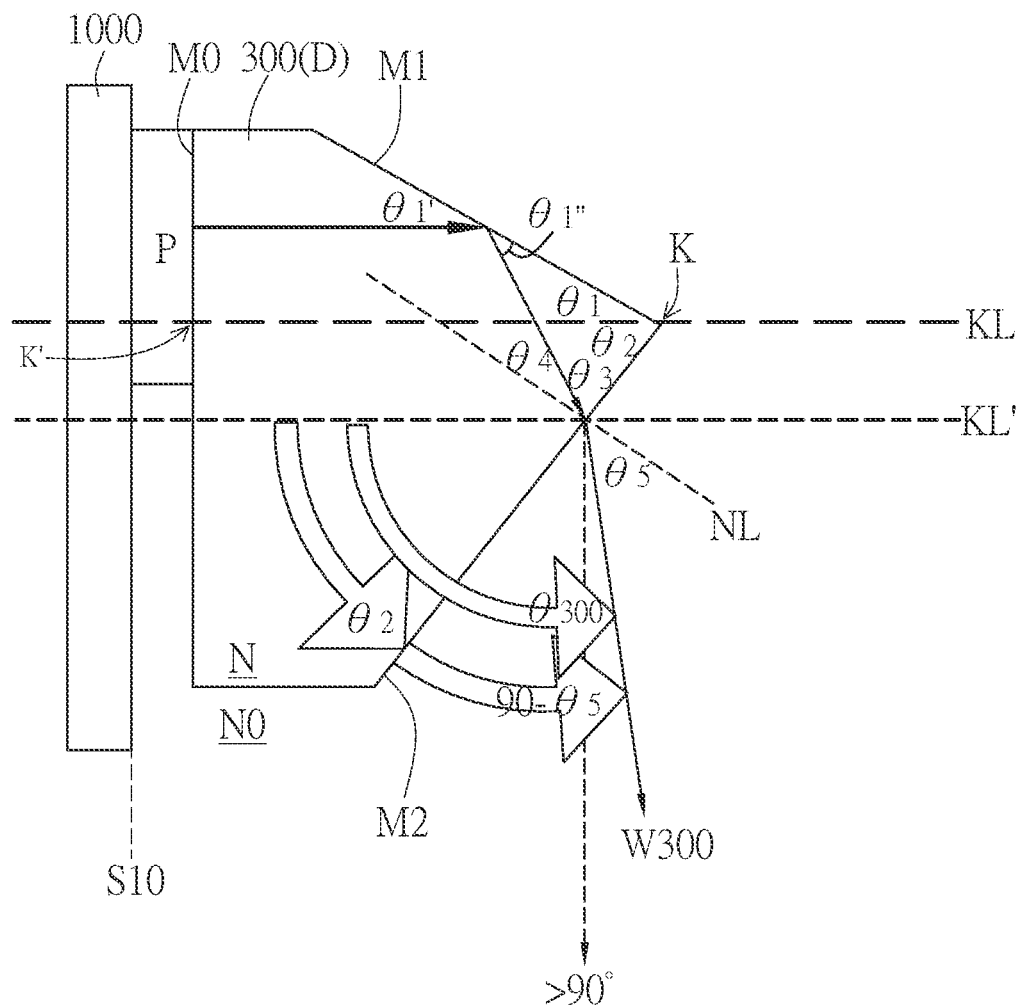
FIG. 14 is a diagram illustrating an angle layout of the lens as a light orientation element in an embodiment according to the present disclosure.

Please refer to FIG. 14. According to the present embodiment, a line connecting the corner point K and the reference corner point K' of a lens 300 can be defined to be a reference line KL. And a virtual line parallel to the reference line KL, passing through the location where the illumination light W300 is incident to the second refracting surface M2 is defined to be a reference line KL'. With the help of the definitions of the reference lines KL and KL', in the lens 300, the angle θ1 is the included angle between the first reflective surface M1 and the reference line KL; the angle θ1' is the included angle between the illumination light W300 incident to the lens 300 and the first reflective surface M1, and is identical to the angle θ1. The angle θ1" is the included angle between the illumination light W300 after exiting from the first reflective surface M1 and the first reflective surface M1. And the angle θ1" is identical to the angle θ1. The angle θ2 is the included angle between the second refracting surface M2 and the reference line KL or the reference line KL'. The angle θ3 is the angle 180 degree minus the total of the angle θ1, the angle θ1" and the angle θ2. The angle θ4 is the included angle between the light reflected by the first reflective surface M1 and the normal line NL of the second refracting surface M2, and equals to the angle 90 degree minus the angle θ3. And the angle θ5 is the angle between the light exiting from the second refracting surface M2 and the normal line NL of the second refracting surface M2. In summary, the relationships may be derived that:

$$\theta_1 = \theta_1' = \theta_1''$$

$$\theta_1' + \theta_1 + \theta_2 + \theta_3 = 180°, \theta_3 = 180° - 2*\theta_1 - \theta_2$$

$$\theta_4 = 90° - \theta_3 = 2*\theta_1 + \theta_2 - 90$$

The refractive index of the lens 300 is set to be the refractive index N. And the refractive index of a medium after exiting from the lens 300 is set to be the refractive index NO. For example, in the present embodiment, if the lens 300 is configured to be in contact with the outside air, the refractive index NO is then 1, and the relationships may be derived in accordance with Snell's Law as follows:

$$N \sin \theta_4 = N_O \sin \theta_5$$

$$\theta_5 = \sin^{-1}[N \sin \theta_4] = \sin^{-1}[N \sin(2\theta_1 + \theta_2 - 90)]$$

Since the lens needs to guide the illumination light W300 to a surface in front of the display device such as the ground, the angle θ300 of the exiting illumination light W300 deflected with respect to the reference line KL' needs to be larger than 90° (irradiating to the ground right below) and smaller than 180° (irradiating to a ground infinitely far). In addition, the angle between the second refracting surface M2 and the normal line NL thereof is 90 degree. And the included angle between the second refracting surface M2 and the illumination light W300 exiting from the lens 300 equals to 90 degree minus θ5. As mentioned above, the relationship can be derived as follows:

$$90° < \theta 300 = [\theta 2 + (90 - \theta 5)] < 180°$$

Through the mentioned derivation, after substituting each data, if the total internal reflection needs to occur on the first reflective surface M1, the angle θ1 and the angle θ2 need to satisfy the following relationships:

$$\theta_1 < 45°$$

$$0.12\theta_1^2 - 6.7\theta_1 + 91 < \theta_2 < -0.12\theta_1^2 + 4.3\theta_1 + 53.3$$

Based on the derivation above, the lens 300 can be designed by configuring the included angle between the first reflective surface M1 and the second refracting surface M2 and the proportion thereof with the angle θ1 and the angle θ2 within an applicable range. However, the above merely represents an example, and the derivation may be adjusted based on the mentioned principles in accordance with the coefficients in the actual usage environment such as the varied refractive indexes. In addition, the lens structure in the aforementioned embodiment also merely represents an example, and it can be applied in the lens structure described in various embodiments of the present disclosure and is not limited thereto.

Figure 15:
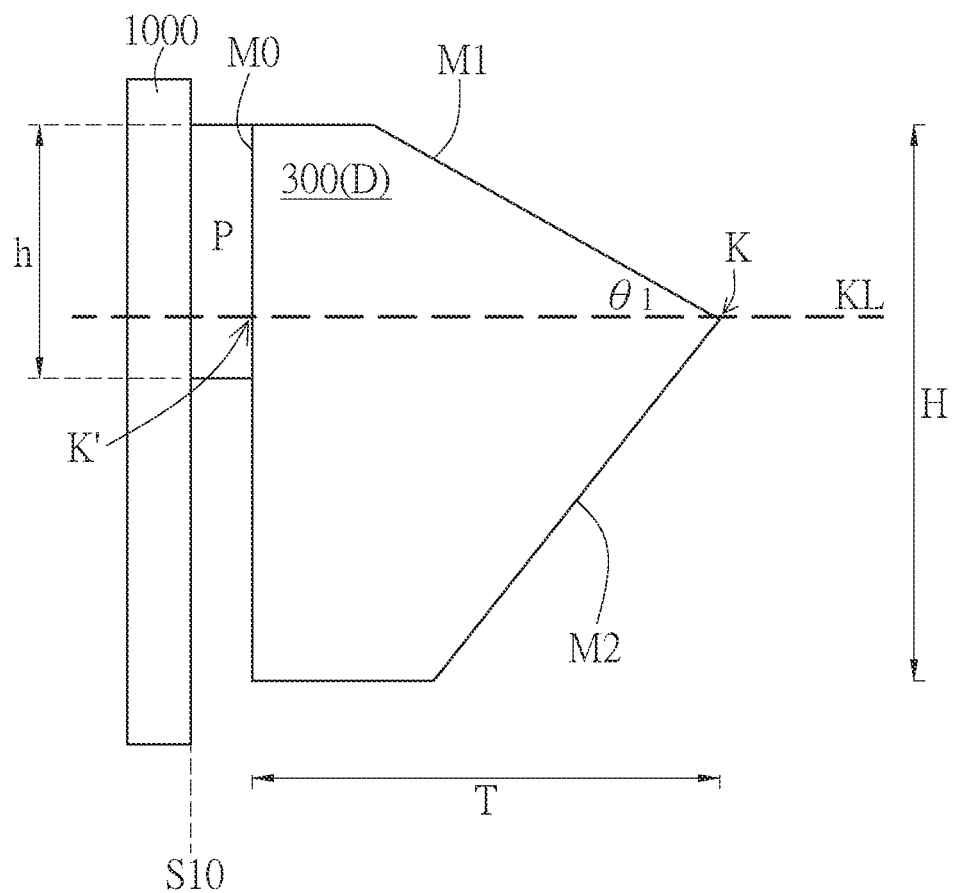
FIG. 15 is a diagram illustrating a size of the lens as a light orientation element in an embodiment according to the present disclosure.

According to another embodiment of the present disclosure, the first reflective surface M1 and the second refracting surface M2 are perpendicularly projected under the display surface S10 of the display panel 1000. Preferably, the illumination sub-pixel P emitting light parallel to the display surface S10 of the display panel 1000 has a partition, and larger than ⅔ of the area thereof is opposite to the first reflective surface M1. For example, as shown in FIG. 15, when viewing the cross-section along the direction perpendicular to the display surface of the display panel 1000, two-thirds of the length h of the illumination sub-pixel P preferably fall on the side divided by the reference line KL and close to the first reflective surface M1. In another embodiment, the length h of the illumination sub-pixel P may perfectly fall on the side divided by the reference line KL and close to the first reflective surface M1. In addition, in some embodiments, when viewing along the cross-section perpendicular to the display surface S10 of the display panel 1000, the length H of the lens 300 parallel to the length h of the illumination sub-pixel P may range from 300 μm to 900 μm, and the thickness T perpendicular to the length H may range from 200 μm to 1200 μm (when the angle θ1=20°) or range from 200 μm to 600 μm (when the angle θ1=45°). However, the above merely represent examples and the lens structures applicable in each embodiment of the present disclosure are not limited thereto.

Furthermore, according to some embodiments of the present disclosure, at least one of the second refracting surfaces of the lens of the display panel is a camber. That is, the second refracting surfaces may have a curvature. For example, please refer to FIG. 16. According to the present embodiment, different lenses 510, 520, 530 and 540 and the like may be configured for different illumination sub-pixels as the light orientation element. Therefore, the second refracting surfaces M21, M22, M23 and M24 of the different lenses 510, 520, 530 and 540 may respectively have different curvatures. For example, the second refracting surfaces M21, M22, M23 and M24 may have different curvatures which are gradually varied. Specifically, the second refracting surface M21 may be a plane; the second refracting surface M22 may be a camber protruding with respect to the second refracting surface M21; the second refracting surface M23 may be a camber protruding with respect to the second refracting surfaces M21 and M22; and the second refracting surface M24 may be a camber protruding with respect to the second refracting surfaces M21, M22 and M23.

Figure 16:
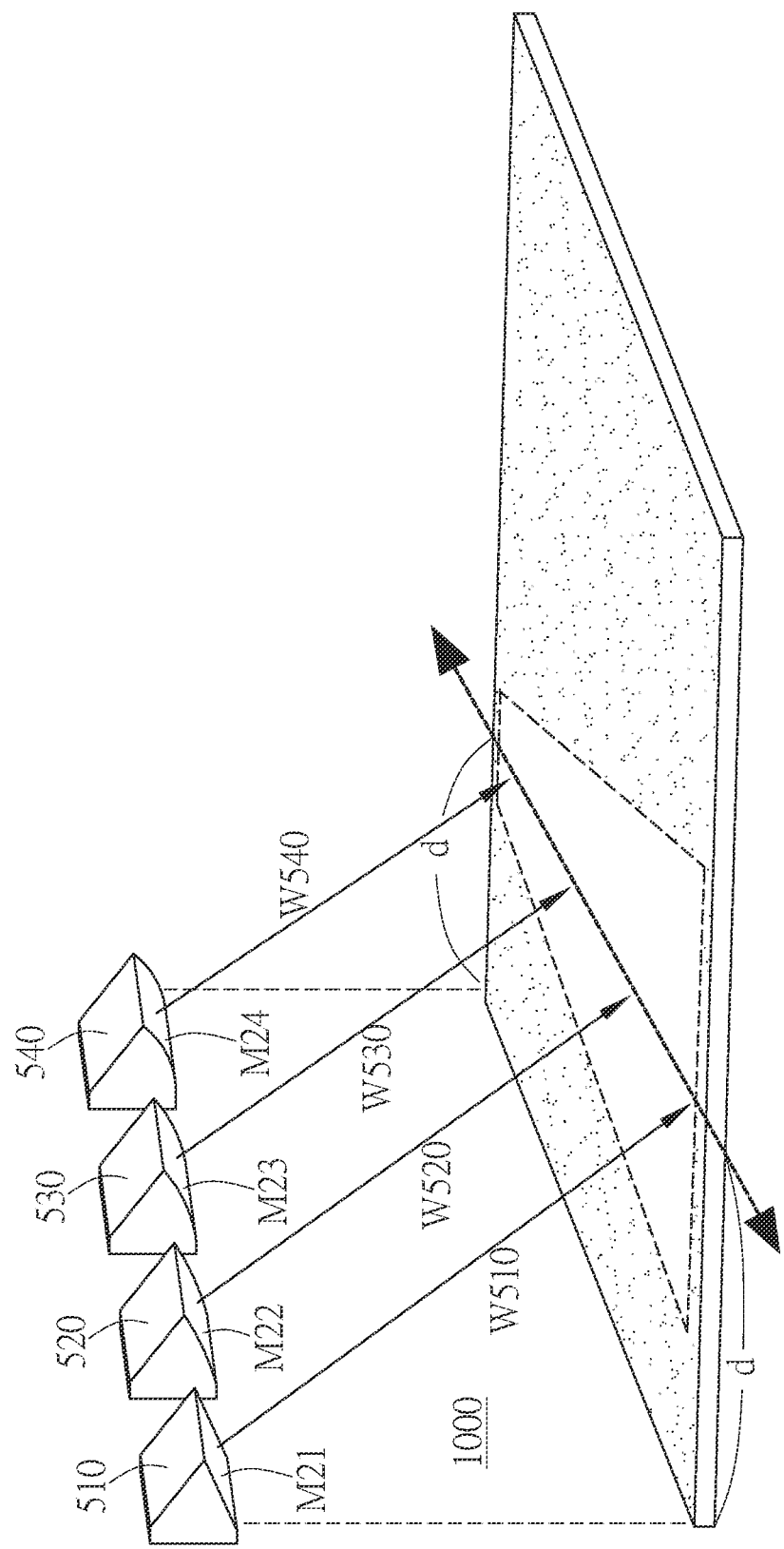
FIG. 16 is a diagram of projected light which is varied based on the curvature of a second refracting surface of the lens in an embodiment according to the present disclosure.

Please refer to FIG. 16. In the case of the same emergence angle and emergence location, the illumination light W510, W520, W530 and W540 exiting the second refracting surfaces M21, M22, M23 and M24 having different curvatures may have different levels of concentration and diffusion. Specifically, even if the lenses 510, 520, 530 and 540 guide the light to a location the same distance d away from the display panel 1000, the illumination light W510, W520, W530 and W540 may also have different levels of diffusion with respect to the location the distance d from the center (such as a divergence angle). For example, the illumination light W510 exiting from the second refracting surface M21 which is relatively flat can be relatively diverged, and the illumination light W540 exiting from the second refracting surface M24 having a relatively protruded camber can be relatively concentrated, and the illumination light in between them is varied similarly. Therefore, the levels of concentration and diffusion and the shapes of the projected light can be further adjusted by adjusting the curvatures and the shapes of the second refracting surfaces. Thus, the possible environment light can be simulated more naturally.

In some embodiments, the same one of the second refracting surface of the integrated lens may have different curvatures which is gradually varied so as to create gradually varied levels of concentration and diffusion more naturally.

Figure 17:
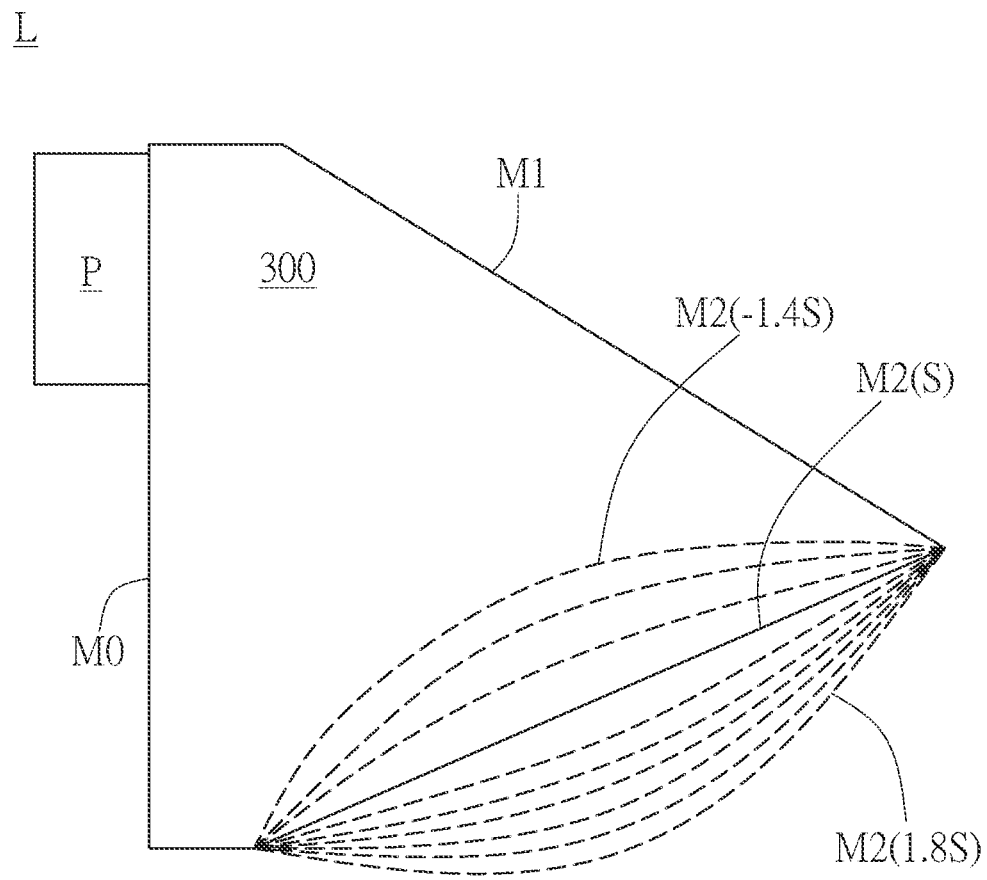
FIG. 17 is a diagram illustrating the varied curvature of the second refracting surface of the lens in an embodiment according to the present disclosure.

Next, please refer to FIG. 17. In each embodiment according to the present disclosure, in addition to a camber protruding outwardly, the second refracting surface M2 may also have a camber caving inwardly. In some embodiments, if the length of the second refracting surface M2 when it is a plane, which neither caves inor protrudes out, is the length S, the possible radius of the curvature of the second refracting surface M2 when it caves in or protrudes out may range from −1.4 times of the length S (the most caved state) to infinity (the flat state) to 1.8 times of the length S (the most protruding state). However, the above merely represents an example, and the present disclosure is not limited thereto.

Below, the patterns of some embodiments in which a plurality of lenses are disposed are further described.

Figure 18:
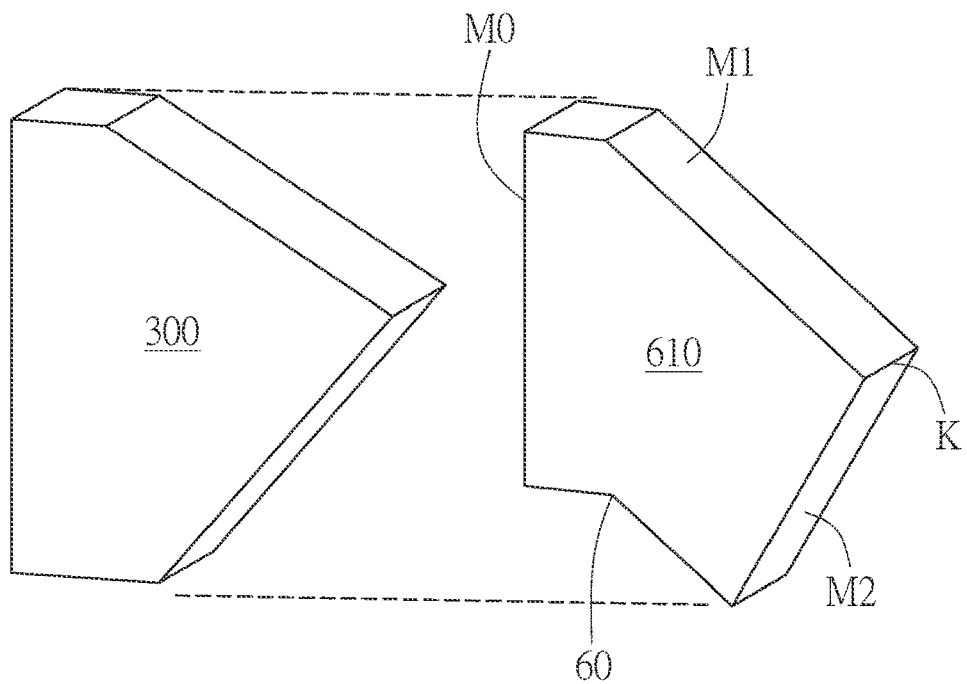
FIG. 18 is a diagram of a lens having a notch in an embodiment according to the present disclosure.

Please refer to FIG. 18. In some embodiments according to the present disclosure, when the lenses of the illumination matrix MX are close to each other, as opposed to the aforementioned lenses such as the lens 300, at least one lens 610 as a light orientation element may have a concave 60. Wherein the concave 60 may be formed between the second refracting surface M2 and the incident surface M0 of the lens 610, away from the corner point K on the second refracting surface M2.

Figure 19:
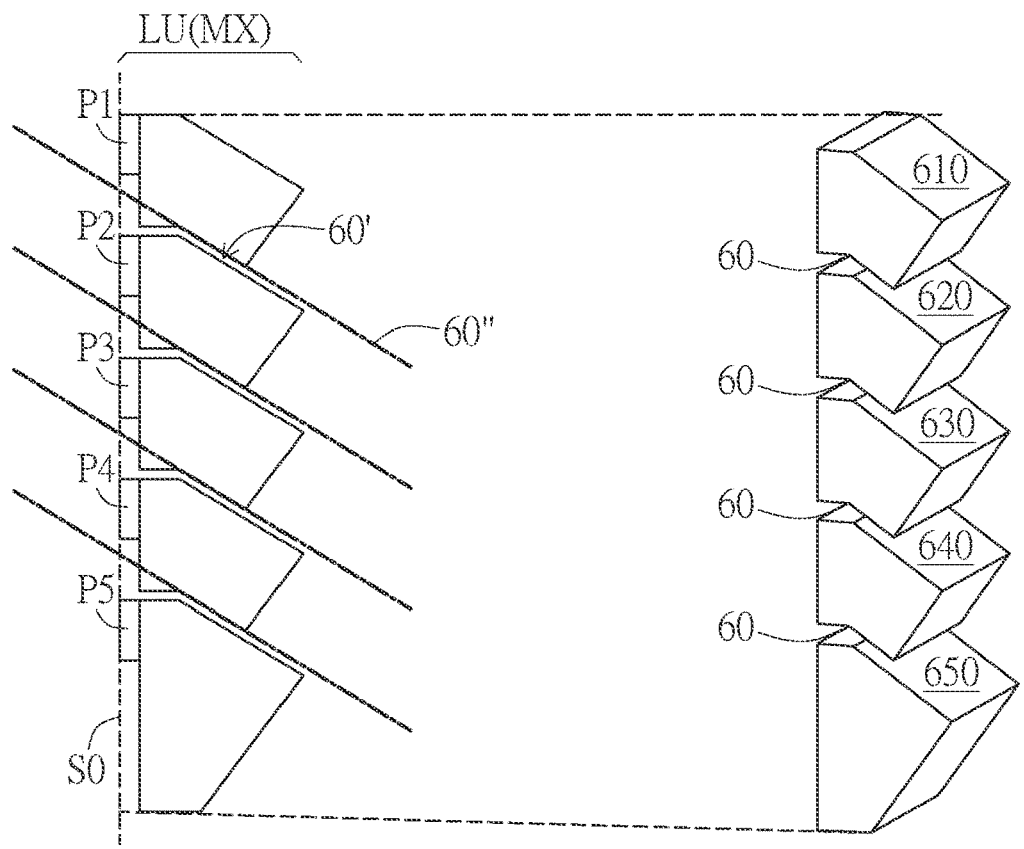
FIG. 19 is a diagram of lenses coupled with each other in an embodiment according to the present disclosure.

Please refer to FIG. 19 together with FIG. 18. When the illumination unit LU forms the illumination matrix MX, each of the illumination sub-pixels such as the illumination sub-pixels P1, P2, P3, P4 and P5 may have a plurality of lenses 610, 620, 630, 640 and 650 as the light orientation element. Wherein, for example, each of the adjacent illumination sub-pixels P1 and P2 in the corresponding illumination matrix MX of the illumination unit LU has the first lens 610 and the second lens 620. And a part of the second lens 620 is accommodated in the concave 60 of the first lens 610, so that the first lens 610 and the second lens 620 are fitted together.

When the virtual plane 60″, which extends from the cohesion surface 60′ on which the concaves 60 of the first lens 610 and the second lens 620 are fitted, passes through the disposing surface S0 on which the illumination sub-pixels P1, P2, P3, P4 and P5 are disposed, it may fall in between the corresponding adjacent illumination sub-pixels P1 and P2 in the illumination matrix MX, and will not intersect either one of the corresponding adjacent illumination sub-pixels P1 and P2. As mentioned above, with this configuration, each of the lenses 610, 620, 630, 640 and 650 may be sequentially fitted to each other in accordance with the needs, and the arrangement of each of the lenses 610, 620, 630, 640 and 650 of the illumination matrix MX is more closely fitted. Therefore, the uniformity and density of the projected illumination light may increase and the occurrence of dark bands can be decreased or avoided. In addition, the limited space for disposing elements may also be used more effectively by configurating each of the lenses 610, 620, 630, 640 and 650 to be fitted to each other.

Figure 20:
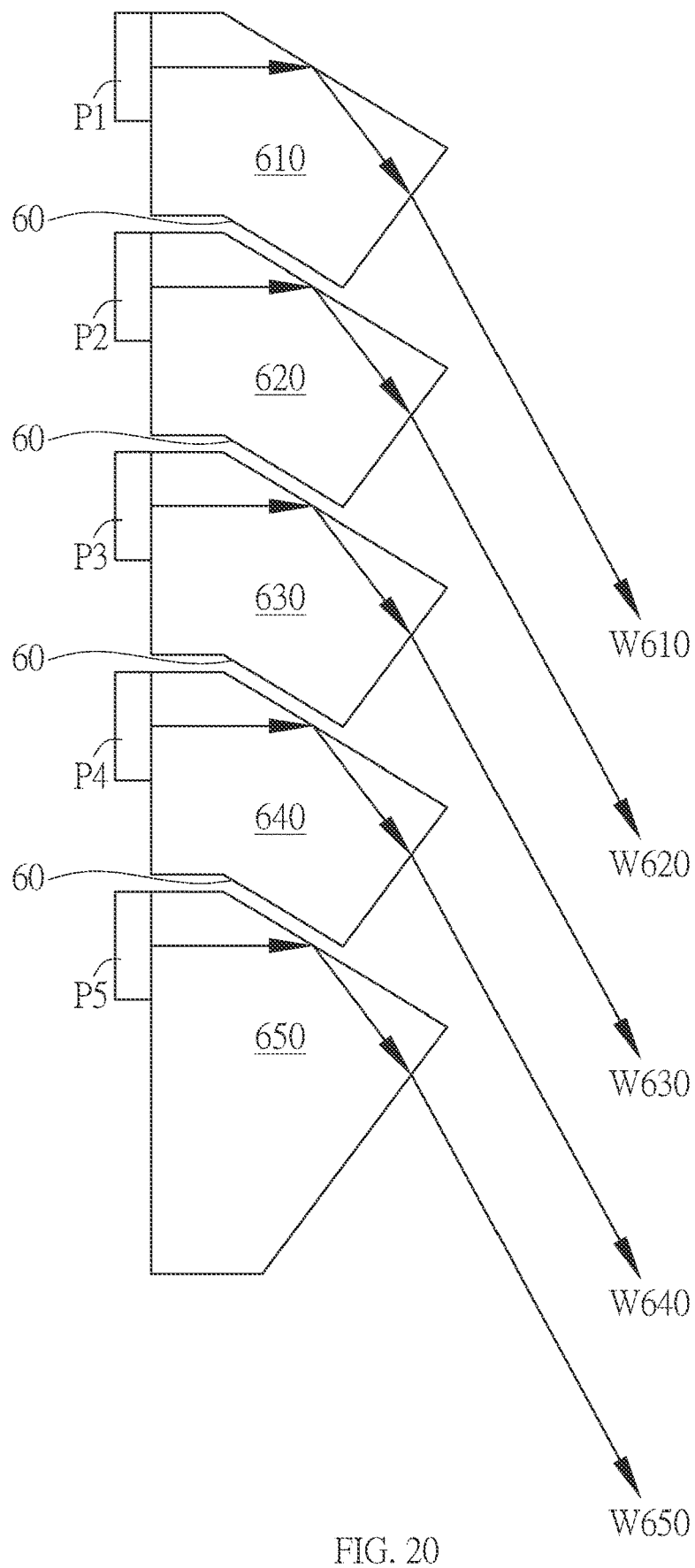
FIG. 20 is a light diagram of projected light through the lenses coupled with each other in an embodiment according to the present disclosure.

Furthermore, please refer to FIG. 20. In accordance with the configuration of the lenses 610, 620, 630, 640 and 650 fitted to each other, interference to the light emission can be avoided or decreased. For example, the pointing direction of the light emission from the first lens 610 (the illumination light W610) emitted through the illumination sub-pixel P1 corresponding to the first lens 610 does not intersect with the concave 60. That is, the central column of the light field distribution of the illumination light W610 or the direction that the intensity of the light is greatest does not intersect with the concave 60. Similarly, the pointing directions of the illumination light W620, W630, W640 and W650 may also avoid intersecting with each of the concaves 60. Therefore, losses of the emitted illumination light can be decreased as much as possible or be avoided so as to achieve higher effects of illumination and projection.

In summary, the display devices provided by each embodiment according to the present disclosure may display images with no specific directionalities and project the illumination with specific directionalities respectively and independently. And the expressions and directionalities of the illumination light can be changed by switching on the required illumination sub-pixels. Different effects of light projection can be presented without any obstruction of viewing the display screen so as to increase the sense of layering and applicability of the display device. Furthermore, when used for simulating natural light, the experience of the users can be enriched or the physical and mental health of the users can be improved.

The mentioned contents merely represent some better mode embodiments of the present disclosure. Please note that various changes and modifications of the present disclosure are allowed without departing from the conception principles of the present invention. People skilled in the art should understand that the scope of the present disclosure are defined by claims, and various replacements, combinations, modifications, and shifting based on intention of the present disclosure are all viewed as being embraced by the scope of the present disclosure.

What is claimed is:

1. A display device, comprising:
a display panel having a display surface and a plurality of pixels,
wherein at least some of the pixels includes:
an illumination unit having at least one illumination sub-pixel and at least one light orientation element respectively and correspondingly disposed on the at least one illumination sub-pixel, wherein illumination light from the illumination sub-pixel is directly or indirectly emitted from the display surface through the light orientation element; and
a display unit having at least one display sub-pixel, and display light from the display sub-pixel is directly or indirectly emitted through the display surface,
wherein the light orientation element includes a lens, the lens has an incident surface relatively approaching to the corresponding illumination sub-pixel and a first reflective surface and a second refracting surface facing the incident surface and relatively away from the corresponding illumination sub-pixel, and a reference point perpendicularly projecting an extreme point where the first reflective surface and the second refracting surface are intersected with on the corresponding illumination sub-pixel is away from a center of the illumination sub-pixel.

2. The display device according to claim 1, wherein each of the at least one illumination sub-pixel and the at least one display sub-pixel is a self-luminous light source.

3. The display device according to claim 1, further comprising a backlight source disposed on a side of the display panel opposite to the display surface, and the at least one illumination sub-pixel and the at least one display sub-pixel are respectively formed by a light adjustable layer folded in the display panel.

4. The display device according to claim 1, wherein the at least one light orientation element includes a first light orientation element and a second light orientation element, the first light orientation element and the second light orientation element respectively guiding the illumination light to different pointing directions.

5. The display device according to claim 1, wherein one of the at least one illumination sub-pixel is controlled independently with respect to the at least one display sub-pixel and the other of the illumination sub-pixels so as to be switched on or switched off.

6. The display device according to claim 1, wherein one of the illumination sub-pixels is controlled independently with respect to the other of the illumination sub-pixels in the same pixel so as to be switched on switched off.

7. The display device according to claim 1, wherein a maximum section area of the lens parallel to the display surface is greater than a maximum section area of the corresponding illumination sub-pixel parallel to the display surface.

8. The display device according to claim 1, wherein at least one shape of a cross-section of the lens perpendicular to the display surface is an asymmetrical pentagonal prism.

9. The display device according to claim 1, wherein light exited from the corresponding illumination sub-pixel is configured to be incident to the lens from the incident surface, and to be reflected by the first reflective surface passing through the second refracting surface so as to be away from a center of the corresponding illumination sub-pixel and to be exited from the lens.

10. The display device according to claim 9, wherein when viewing along a cross-section of the lens perpendicular to the display surface:
when light exited from the corresponding illumination sub-pixel approaches to the extreme point with respect to a normal line of the second refracting surface to be incident to the second refracting surface, the light is configured to be refracted through the second refracting surface and to be away from the extreme point with respect to the normal line of the second refracting surface to exited from the lens; and
when light exited from the corresponding illumination sub-pixel is away from the extreme point with respect to the normal line of the second refracting surface to be incident to the second refracting surface, the light is configured to be refracted through the second refracting surface and to approach to the extreme point with respect to the normal line of the second refracting surface to be exited from the lens.

11. The display device according to claim 9, wherein at least one of the second refracting surface of the lens of the display panel is a cambered surface.

12. The display device according to claim 11, wherein the same one of the second refracting surface has different curvatures varied progressively or at least different two of the second refracting surface have different curvatures.

13. The display device according to claim 1, wherein each of the illumination units includes an illumination array consisting of a plurality of illumination sub-pixels, and each of the illumination sub-pixels in the illumination array is controlled independently with respect to the other of the illumination sub-pixels so as to be switched on or switched off.

14. The display device according to claim 13, wherein the illumination sub-pixels forming the illumination array includes a first illumination sub-pixel having a first color temperature and a second illumination sub-pixel having a second color temperature.

15. The display device according to claim 13, wherein the illumination sub-pixels forming the illumination array includes a first illumination sub-pixel and a second illumination sub-pixel, and the at least one light orientation element includes a first light orientation element disposed on the first illumination sub-pixel corresponding to the first illumination sub-pixel and a second light orientation element disposed on the second illumination sub-pixel corresponding to the second illumination sub-pixel, and
wherein the first light orientation element and the second light orientation element have different pointing directions, so that angles of emergence from the display pane are different between light exited from the first illumination sub-pixel and light exited from the second illumination sub-pixel.

16. The display device according to claim 13, wherein the adjacent illumination sub-pixels in the corresponding illumination array of the illumination units respectively has a first lens and a second lens, and
wherein the first lens has a concave, and a part of the second lens is accommodated in the concave, so that the first lens and the second lens are fitted with each other, and wherein a pointing direction of emergence from the first lens of light exited from the illumination sub-pixel of corresponding to the first lens is not intersected with the concave.

17. The display device according to claim 16, wherein when a virtual plane extending from an interface on which the concaves of the first lens and the second lens are fitted to passes through a disposing surface on which the illumination sub-pixels are disposed, the virtual plane fall in the corresponding adjacent illumination sub-pixels in the illumination array, and not any one of the corresponding adjacent illumination sub-pixel.

18. A display device, comprising:
a display panel having a display surface, a plurality of illumination units and a plurality of display units disposed corresponding to the plurality of illumination units;
wherein each of the plurality of illumination units has at least one illumination sub-pixel and at least one light orientation element respectively and correspondingly disposed on the at least one illumination sub-pixel, wherein illumination light from the illumination sub-pixel is directly or indirectly emitted from the display surface through the light orientation element, and
wherein each of the plurality of display units has at least one display sub-pixel, display light from the display sub-pixel is directly or indirectly emitted through the display surface, wherein the light orientation element includes a lens, the lens has an incident surface relatively approaching to the corresponding illumination sub-pixel and a first reflective surface and a second refracting surface facing the incident surface and relatively away from the corresponding illumination sub-pixel, and a reference point perpendicularly projecting an extreme point where the first reflective surface and the second refracting surface are intersected with on the corresponding illumination sub-pixel is away from a center of the illumination sub-pixel.

19. The display device according to claim 18, wherein each of the at least one illumination sub-pixel and the at least one display sub-pixel is a self-luminous light source.

20. The display device according to claim 18, further comprising a backlight source disposed on a side of the display panel opposite to the display surface, and the at least one illumination sub-pixel and the at least one display sub-pixel are respectively formed by a light adjustable layer folded in the display panel.

21. The display device according to claim 18, wherein the at least one light orientation element includes a first light orientation element and a second light orientation element, the first light orientation element and the second light orientation element respectively guiding the illumination light to different pointing directions.

22. The display device according to claim 18, wherein one of the at least one illumination sub-pixel is controlled independently with respect to the at least one display sub-pixel and the other of the illumination sub-pixels so as to be switched on or switched off.

23. The display device according to claim 18, wherein each of the illumination units includes an illumination array consisting of a plurality of illumination sub-pixels, and each of the illumination sub-pixels in the illumination array is controlled independently with respect to the other of the illumination sub-pixels so as to be switched on or switched off.

24. The display device according to claim 23, wherein the illumination sub-pixels forming the illumination array includes a first illumination sub-pixel having a first color temperature and a second illumination sub-pixel having a second color temperature.

25. The display device according to claim 23, wherein the illumination sub-pixels forming the illumination array includes a first illumination sub-pixel and a second illumination sub-pixel, and the at least one light orientation element includes a first light orientation element disposed on the first illumination sub-pixel corresponding to the first illumination sub-pixel and a second light orientation element disposed on the second illumination sub-pixel corresponding to the second illumination sub-pixel, and
wherein the first light orientation element and the second light orientation element have different pointing directions, so that angles of emergence from the display pane are different between light exited from the first illumination sub-pixel and light exited from the second illumination sub-pixel.

26. The display device according to claim 23, wherein the adjacent illumination sub-pixels in the corresponding illumination array of the illumination units respectively has a first lens and a second lens, and
wherein the first lens has a concave, and a part of the second lens is accommodated in the concave, so that the first lens and the second lens are fitted with each other, and
wherein a pointing direction of emergence from the first lens of light exited from the illumination sub-pixel of corresponding to the first lens is not intersected with the concave.

27. The display device according to claim 26, wherein when a virtual plane extending from an interface on which the concaves of the first lens and the second lens are fitted to passes through a disposing surface on which the illumination sub-pixels are disposed, the virtual plane fall in the corresponding adjacent illumination sub-pixels in the illumination array, and not any one of the corresponding adjacent illumination sub-pixel.

* * * * *